United States Patent
Ota et al.

(10) Patent No.: US 7,162,617 B2
(45) Date of Patent: Jan. 9, 2007

(54) DATA PROCESSOR WITH CHANGEABLE ARCHITECTURE

(75) Inventors: Ken Ota, Tokyo (JP); Toshiyuki Kochi, Chiba (JP)

(73) Assignee: Fine Arc Incorporated, Tokyo (JP)

( * ) Notice: Subject to any disclaimer, the term of this patent is extended or adjusted under 35 U.S.C. 154(b) by 496 days.

(21) Appl. No.: 10/367,097

(22) Filed: Feb. 14, 2003

(65) Prior Publication Data

US 2004/0162964 A1    Aug. 19, 2004

(51) Int. Cl.
G06F 7/38    (2006.01)
G06F 9/00    (2006.01)
G06F 9/44    (2006.01)
G06F 15/00   (2006.01)

(52) U.S. Cl. .................. 712/229; 712/214; 712/227
(58) Field of Classification Search .................. 712/227
See application file for complete search history.

(56) References Cited

U.S. PATENT DOCUMENTS

| | | | | |
|---|---|---|---|---|
| 5,925,124 A | * | 7/1999 | Hilgendorf et al. | ......... 712/227 |
| 6,014,735 A | * | 1/2000 | Chennupaty et al. | ....... 712/210 |
| 6,154,819 A | * | 11/2000 | Larsen et al. | ............... 711/163 |
| 6,760,832 B1 | * | 7/2004 | Nishimoto et al. | ........... 712/24 |
| 6,917,997 B1 | * | 7/2005 | Bhagat | ........................ 710/261 |
| 2002/0169945 A1 | * | 11/2002 | Haraguchi | ................... 712/205 |

* cited by examiner

Primary Examiner—Eddie Chan
Assistant Examiner—Brian Johnson
(74) Attorney, Agent, or Firm—Howson & Howson LLP

(57) ABSTRACT

A program counter having an independent context for each virtual processor is provided, and a non-native instruction fetched from a main memory based on address information generated by the program counter is classified by property by an instruction classifying unit. Then an instruction merge information memory is read out utilizing address information prescribed for each classified group as reference address, and native execution control information is merged and executed. Selection and switching of the virtual processor is performed through selectively switching the instruction classifying unit and an active portion of the instruction merge information memory, and the switching timing is appropriately adjusted by synchronizing with a switching enabling signal output from the instruction merge information memory.

16 Claims, 8 Drawing Sheets

DATA PROCESSOR WITH CHANGEABLE ARCHITECTURE

BACKGROUND OF THE INVENTION

1. Field of the Invention

The present invention relates to a processor capable of switching/reconstituting its architecture, comprising a processor architecture conversion unit for executing a plurality of types of processor instruction sets of different architecture with one and the same hardware, by which the processor architecture can easily be switched or reconstituted because the processor architecture constitution information in the processor architecture conversion unit is concentratedly stored in several means for memorizing.

2. Description of the Related Art

Conventionally, all processors have been provided with a single instruction set appropriate to its hardware architecture that can be directly executed (hereinafter referred to as a "native instruction set"), and have been unable to directly execute any software program designed for an instruction set of a different architecture (hereinafter referred to as a "non-native architecture"). Items to be considered when executing a software program for a non-native architecture include, in addition to the difference of instruction sets, difference of formality processing appropriate to the processor hardware architecture, such as typically an exception processing. Since such processing is in general automatically executed according to the processor hardware, an instruction for the required formality is not introduced from outside. Accordingly, by a simple instruction conversion it is impossible to execute a software program designed for a non-native architecture with respect to exception processing. From such a viewpoint, in order to execute a software program designed for a non-native architecture by a processor, it has been necessary to provide means for virtually achieving a function that is appropriate to the processor hardware in addition to instruction conversion processing for converting a non-native instruction into a native one.

The virtual achievement of instruction conversion and a function appropriate to hardware can be broadly classified into the achievement by software and that by hardware.

One of the easiest ways to convert an instruction by hardware is to adopt a lookup table. A prescribed lookup table in which correspondence of non-native instructions with native instructions is prepared in advance, so that an arbitrary instruction binary value of a non-native instruction set can be referred as a reference address according to the lookup table, to read out not less than one corresponding native instruction. By this method, an instruction conversion can be executed much more quickly than a conversion by software, and a non-native instruction set application program can be executed no less quickly than executing a native instruction set program in terms of execution speed of an application program, though there may be a slight time-lag because of the conversion.

However, this method has the following disadvantage. When converting according to a lookup table, a one-on-one instruction conversion is basically assumed. Generally, a CISC (Complex Instruction Set Computer) type instruction set sometimes includes a case where an extremely complicated processing is executed through a single instruction, such as a singular, combined and/or repeated processing of functions like memory address calculation, memory access, computation etc. for which complicated operations are required, however in order to convert such a complicated instruction into an RISC (Reduced Instruction Set Computer) type instruction set, since a one-on-multiple instruction conversion is indispensable, a simple one-on-one lookup table method cannot be employed in such a case. In case where a one-on-multiple conversion is to be executed at all by lookup table method, a lookup table of an extremely large capacity (memory capacity in general) would be required, which would cause a prohibitive cost increase.

In order to restrict the increase of a lookup table capacity, a proposition has been made that while separately extracting only field information that has a particular meaning in a certain portion of an instruction word (such information as computation register designation, memory access addressing mode designation, etc.) through an exclusive combinational logic circuit, reference is made with the lookup table based on instruction binary information of the remaining portion of the original instruction word length except the above field portion, and the converted instruction word and the extracted field information are merged so as to convert into a native instruction word. However in many of the CISC type instruction sets especially those with a short instruction bit length, position or length of field information that has a particular meaning in a portion of the instruction word is not constant but different depending on instructions, therefore it is difficult to apply the above-proposed method. Accordingly in such a case the only possible way is to refer to the lookup table using all binary values of the instruction word as reference address, and consequently a large lookup table capacity is required. For instance, for executing a one-on-one conversion of a CISC type instruction set having a basic length of 16 bits into a VLIW type instruction set of 128 bits by a simple lookup table, a lookup table of a capacity of as large as 1 MB (Megabyte) is required, which makes it impossible to employ this system from a view point of cost. Further, in case of converting a CISC type instruction set of a basic length of 32 bits, the required lookup table capacity reaches as great as 64 GB (Gigabyte), which is impossible to integrate in one chip with the currently available semiconductor technology.

Another major problem with the lookup table method is that formality processing cannot be handled.

In view of the foregoing problems, instruction set architecture conversion by an exclusive combinational logic circuit that does not include a lookup table is popularly employed, especially for converting a CISC type instruction set into an RISC type instruction set. By such method, a formality processing, which is unsolvable with the lookup table method, can also be handled through establishing an exclusive state machine. However even in this case, since the combinational logic is fixed, when executing different non-native instruction set architectures on one and the same processor, exclusive instruction conversion circuits for the respective non-native instruction set architectures to be converted have to be provided, which significantly increases the cost. In addition, it is also impossible to freely modify the non-native instruction set architecture to be executed at an operation site of the processor.

It is an object of the invention to provide solutions for the foregoing various problems related to conversion of instruction and architecture by hardware that is prominently superior in execution speed performance among those processor systems capable of executing non-native instruction sets, specifically the problems with the lookup table method that besides requiring a large table (memory) capacity it is impossible to completely reproduce formality processing functions appropriate to the processor architecture such as external interrupt exception processing; with the combinational logic circuit that since the logic is fixed it is difficult to reconstitute the logic, moreover for conversion of a plurality of non-native instruction set architectures a large circuit scale is needed since the same number of combinational logic circuits as the non-native instruction set architectures are required, which results in a disadvantage in cost, etc.

By totally resolving these problems, it becomes possible to convert a plurality of different non-native instruction set programs on one and the same processor at a low cost, maintaining a high execution speed performance and dynamically switching the non-native instruction sets without depending on a native instruction set architecture of an execution unit, and further it will be possible to even select or modify whenever necessary the non-native instruction sets to be converted in operation sites of the processor systems in which the invention is incorporated.

SUMMARY OF THE INVENTION

The present invention provides a processor capable of switching/reconstituting architecture, having an execution unit for executing various processing performed by a processor and connected with means for memorizing instructions, comprising:

means for generating instruction fetch address, for generating an address of an instruction to be fetched from said memorizing means;

means for deciding a group, which serves to decide a group with respect to not less than one property that represents characteristics of said fetched instruction, means for memorizing processor architecture constitution information for storing processor architecture constitution information required for merging from said fetched instruction a native instruction that said execution unit can directly execute, to which native instruction merge information is referred based on said decided group information;

means for extracting instruction parameter field from said fetched instruction based on said referred native instruction merge information;

means for merging not less than one native instruction based on said extracted instruction parameter field and said referred native instruction merge information;

means for controlling said instruction fetch address generating means and discontinuously updating said instruction fetch address when an instruction is branched in said execution unit; and means for designating a reference starting position to said processor architecture constitution information memorizing means; wherein a plurality of processor architectures can be switched by updating said reference starting position, thus enabling execution of software designed for different processor architecture.

As described above, the processor capable of switching/reconstituting architecture according to the invention can easily add or reconstitute a virtual processor architecture to be converted because various kinds of information required for the processor architecture conversion can be concentratedly prepared on the memorizing means of a relatively small capacity installed in the processor, and further enables to easily build up a system in which software for a plurality of kinds of processor architectures can be executed with one and the same hardware resource. In addition, since processor architecture conversion definition information can be easily and rapidly switched, and software for a plurality of different processor architecture can be executed simulatively and simultaneously by one processor, the processor according to the invention is also applicable to a purpose of reutilizing numerous software resources developed on an operation system platform for an obsolete processor as they are on an operation system for a new processor without degrading the performance, in a circumstance where software for a plurality of processor architectures is in confusion because a standard processor architecture has not been established despite operation system specifications have been completed, or in an operation system in which the standard processor architecture has been updated.

Under such circumstances it is often difficult to provide a large main memory region, however the processor capable of switching/reconstituting architecture according to the invention is especially useful in such a case because application software described with an instruction set for a different processor can be executed no less efficiently than in a native circumstance without reserving a substantial portion of the main memory region for the purpose of architecture conversion.

A positive utilization of the capability to easily reconstitute an executable virtual processor includes, not only selecting an existing particular instruction set, but also freely defining and intentionally reconstituting an original instruction set desired by a user. In other words, the user can constitute a program focusing on a higher efficiency of program capacity rather than execution speed in one occasion, or a program with a greater emphasis on higher performance in execution speed than efficiency of program capacity in another occasion, by selecting an optimum instruction set in accordance with a work purpose or custom-defining an exclusive instruction appropriate to a particular job. Such multiple use of the instruction set on a system operation site has been far from feasible with a conventional processor that only has a fixed instruction set.

With an object to achieve the foregoing object, said group deciding means divides processor instruction into at least two bit-fields, and determines numerical groups in the respective bit-fields that consist of not less than one arbitrary numeral among numerals that said divided bit-field can have, and then defines an instruction group in such a manner that an instruction established by concatenating all numerals selected in ones from the respective numerical groups in all said bit-fields constitutes one group by all the combinations of said numerals constituting said numerical groups of the respective bit-fields.

In this embodiment, the processor capable of switching/reconstituting architecture, further comprises:

at least one means for dividing processor instruction, for dividing said processor instruction in a similar way to dividing said bit-fields;

means for memorizing division position information, for memorizing information that determines a division position of the respective bit-fields; and means for memorizing instruction group information of the respective bit-fields, wherein said instruction group information memorizing means is referred to based on said bit-field value extracted by dividing said processor instruction into not less than two bit-fields, and each bit of group candidate information read out by reference from said instruction group information memorizing means corresponds one-on-one to the respective instruction groups, and wherein said instruction group information corresponds to said instruction group in which said bit-field value being referred to is included.

Alternatively, the group deciding means determines, on the basis of each of bit rows of a processor instruction, numerical groups that consist of not less than one arbitrary numeral among numerals that said bit row can have, and then defines an instruction group in such a manner that an instruction established by concatenating all numerals selected in ones from the respective numerical groups of said bit rows of said processor instruction constitutes one group by all the combinations of said numerals constituting said numerical groups of said bit rows of said processor instruction.

The instruction group deciding means according to the invention comprises instruction group information memory unit including not less than one small-scaled memory device that stores information for referring on which instruction group a non-native instruction belongs to upon grouping instructions of a same characteristic among a non-native instruction set; and region extraction/address generation unit for generating an address by which to refer to the instruction group information memory unit according to a bit field value divided into not less than one and extracted in a prescribed format based on binary-codes the given non-native instruction; and refers and acquires group candidate information from each of the memory devices in the instruction group information memory unit based on an address corresponding to each divided bit field generated in the region extraction/address generation unit, and each bit of the group candidate information corresponds one-on-one to each instruction group and shows not less than one instruction group in which the bit field value being referred to can be included; and means for logic and arithmetic operation finally decides one instruction group included in common in all the group candidate information of the respective bit fields.

Further, the instruction group deciding means according to the invention comprises means for switching a reference position depending on selected information for referring to an instruction word constitution information memory unit that stores divided bit field position information of each non-native instruction set, in order to change a bit field position to be divided by binary-codes of the non-native instruction according to processor architecture selection information when switching not less than one non-native instruction set; and a bank switching control unit that stores offset information for each processor architecture to be given to a reference address in an instruction group lookup table for the non-native instruction set, in order to switch such lookup table in the instruction group information memory unit.

As described above, it is an advantage of the instruction group deciding means according to the invention that it can execute a reference of instruction group information for each of the divided bit fields of the binary-codes of the non-native instruction word. A table (hereinafter referred to as a "group candidate information table) including information (hereinafter referred to as "group candidate information") that shows in which instruction group a given bit field value can be included in each of the divided bit fields is provided. In this way, by executing a reference of instruction group information with divided fields, a capacity of the lookup table required for deciding the instruction group can be maintained in a low level. A capacity of each group candidate information table depends on a bit width of the divided bit field to be referred to, and the bit width of the divided bit field is at most several score percent (less than a half in general) of a basic bit width of the binary-code of a non-native instruction word, therefore a much smaller capacity is sufficient than a conventional method of referring with the entire bit width region of the non-native instruction word. For example, in case where a basic bit width of the binary-code of an instruction word in the non-native instruction set to be referred to is 16 bits and assuming that the required group candidate information table has group candidate information of, for simplicity's sake, 8 bits (1 byte) per index word, the table capacity has to be 16th power of 2 bytes, i.e. 65536 bytes in a conventional method of referring with the entire bit width. By contrast, by individually making reference to the group candidate information table for each divided bit field according to the invention, in case where, for instance, the 16 bits binary-code of instruction word is divided into regions of upper 8 bits and lower 8 bits, and width of group candidate information corresponding to an index word of the respective group candidate information table is assumed to be 8 bits (1 byte) as the foregoing example of a conventional method, a group candidate information table capacity has only to be 8th power of 2, i.e. 256 bytes only, and a total of the two tables is still as small as 512 bytes.

The information read out by reference from the group candidate information table (group candidate information) forms one word having a same bit width as a total number of instruction groups that can correspond to a given bit field, and each bit included therein corresponds one-on-one to all the instruction groups that can correspond to the given bit field. And, for instance 1 may be stored for a bit corresponding to an instruction group including a given bit field value, and 0 may be stored for a bit corresponding to an instruction group that doesn't include a given bit field value. It is to be noted that in case where the group candidate information table is read out by reference by a bit field value given to a certain bit field, since there are a plurality of instruction groups that can include this bit field value, a plurality of bits may be set with respect to the group candidate information word read out by reference by this bit field value. By adopting such instruction group information word structure, processing for finally deciding a single instruction group integrating not less than one instruction group information read out by reference for each of the divided bit fields can be executed through a simple logic and arithmetic operation.

In the processor capable of switching/reconstituting architecture, the processor architecture constitution information memorizing means may be a RAM or a non-volatile memory. Also, by providing means for rearranging a byte it becomes possible to execute software designed for a processor architecture having a different byte matrix endian. Further, providing means for memorizing instruction buffer before instruction merging job anterior to an instruction conversion/merge unit, or means for memorizing instruction buffer after instruction merging job posterior to the instruction conversion/merge unit enhances parallelism of the instruction conversion/merge unit, resulting in an improved execution speed performance in case that the instruction merge processing is systemized in a pipeline or instruction processing has been branched. As a matter of course, the two instruction buffer memorizing means may both be provided.

The foregoing formality processing can be executed, according specifically to information memorized in advance in the instruction merge information memorizing means. Also, means for temporarily memorizing may be provided for memorizing branch address information temporarily that has been computed when merging the branch instruction, so that the branch address information may be read out from the temporarily memorizing means when causing the branch in the execution unit and substituted for the instruction fetch address generating means, thus to correctly branch the processing by the processor. Means for memorizing for work may also be provided for temporarily memorizing information required for arithmetic and logic operation to correct a difference of hardware specifications appropriate to processor architecture. In addition, means for notifying outside whether a bus cycle is atomic or not according to information output by the instruction merge information memorizing means may be provided.

Further, separately providing means for executing formality processing for retracting/resetting context information of each processor architecture enables dynamic switching of the processor architecture. Also, providing means for time-shared counting enables automatic switching of the processor architecture based on a timing generated by the time-shared counting means. Accordingly, an operation that apparently looks as if a plurality of processors were simultaneously working can be achieved. It is also feasible to provide an additional memory control unit and to switch the processor architecture based on instruction region decision made by the memory control unit. An exclusive instruction may be defined for switching the processor architecture, so that a formality related to processor architecture switching may be started through execution of the exclusive instruction. Furthermore, providing the execution unit with a plurality of means for arithmetic and logic operation and means for accessing memory, and also means for allocating/dispatching instruction enables simultaneous execution of a plurality of native instructions combined by the instruction allocating/dispatching means by the execution unit. With reference to other means for resolving the problems shall be described in further details in the subsequent description of the preferred embodiments.

The object of independently or simultaneously executing software program designed for one or a plurality of different non-native instruction architectures on one and the same execution unit hardware can be achieved through the steps of connecting the processor capable of switching/reconstituting architecture according to the invention between the execution unit and an instruction memory region (a primary cache memory for instruction); installing means for generating instruction fetch address (program counter) for generating an address by which the instruction is to be fetched from the primary cache memory for instruction; installing means for deciding a group with respect to not less than one instruction property that describes characteristics of the fetched instruction; installing means for memorizing (memory of instruction merge information memory unit) for storing processor architecture information required for merging a native instruction from a non-native instruction; installing means for extracting an instruction parameter field (field extraction unit), for referring native instruction merge information to the processor architecture constitution information memorizing means based on the decided group information, and extracting an instruction parameter field from the fetched non-native instruction based on the referred information required for merging a native instruction; and installing a circuit having means for merging not less than one native instruction (instruction merge unit) based on the extracted instruction parameter field and the referred native instruction merge information, wherein the execution unit is made to stand by while the native instruction is being, and formality processing for an instruction to execute a formality processing or the like or for executing an exceptional processing such as interruption is achieved through executing in sequence instruction merge information read out from the instruction merge information memory unit, while appropriate control signal is simultaneously read out from the instruction merge information memory unit so that execution of exceptional processing such as switching of the processor architecture or the interruption is started only at an appropriate processing threshold of instruction merge processing; and having means for arithmetic and logic operation such as a bit rearrangement circuit, byte rearrangement circuit, numerical extension circuit and summation/subtraction circuit, etc., for correcting a difference of hardware specifications appropriate to the processor architecture, wherein branch address information is calculated in advance at the same time as merging a native branch instruction from a non-native branch instruction so that processing by the processor can be correctly branched in case that a branch is generated in the execution unit, and the branch address information is temporarily stored in the memory unit for work, and the calculated branch address information is substituted in the program counter in case that a branch has actually been generated.

Figure 5:
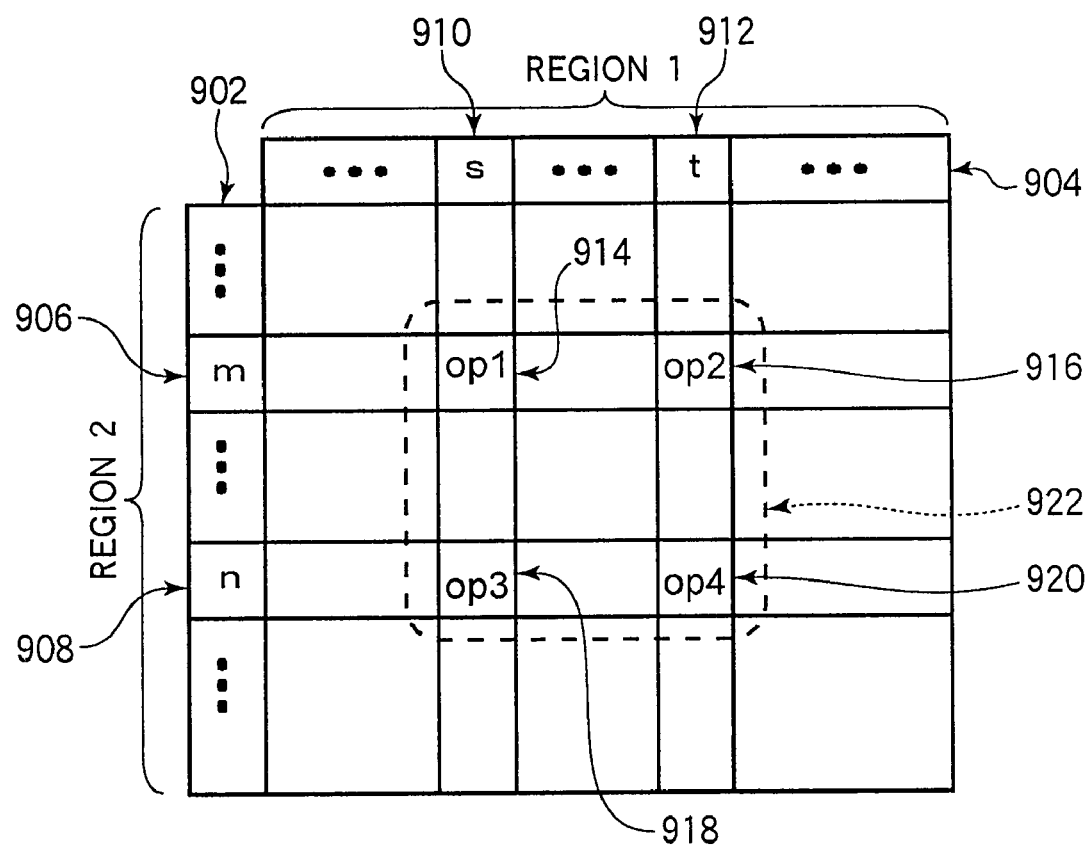
Figure 6:
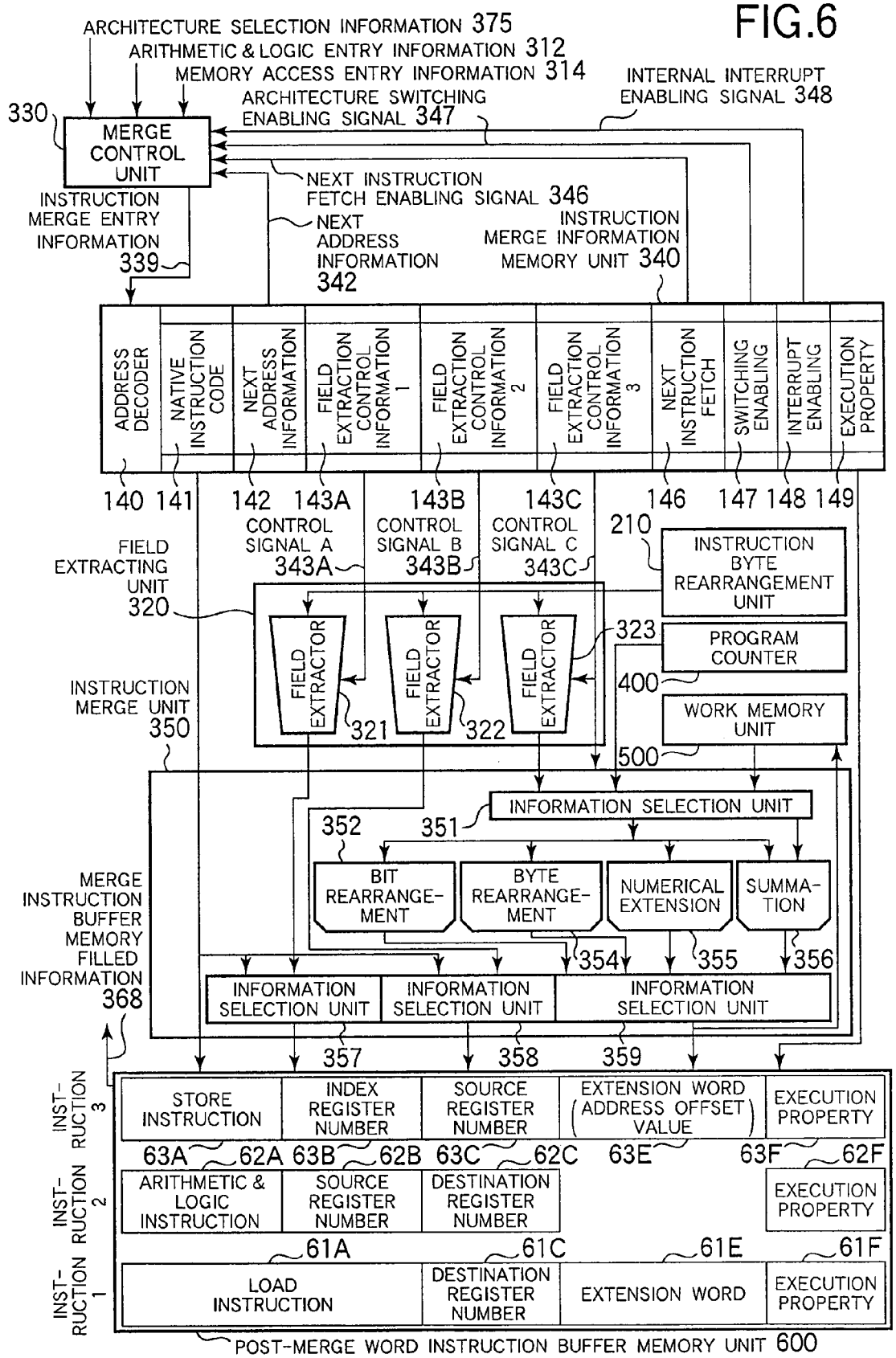

FIG, 4B includes group candidate information tables in case where a binary-code of an instruction word is divided into three bit fields;

FIG. 5 is a schematic drawing showing method of grouping a binary-code of an instruction word divided into bit fields, utilizing the instruction group distribution table; and FIG. 6 is an explanatory block diagram for explaining detailed constitution in the proximity of the instruction merge information memory unit 340.

DESCRIPTION OF THE PREFERRED EMBODIMENTS

Figure 1:
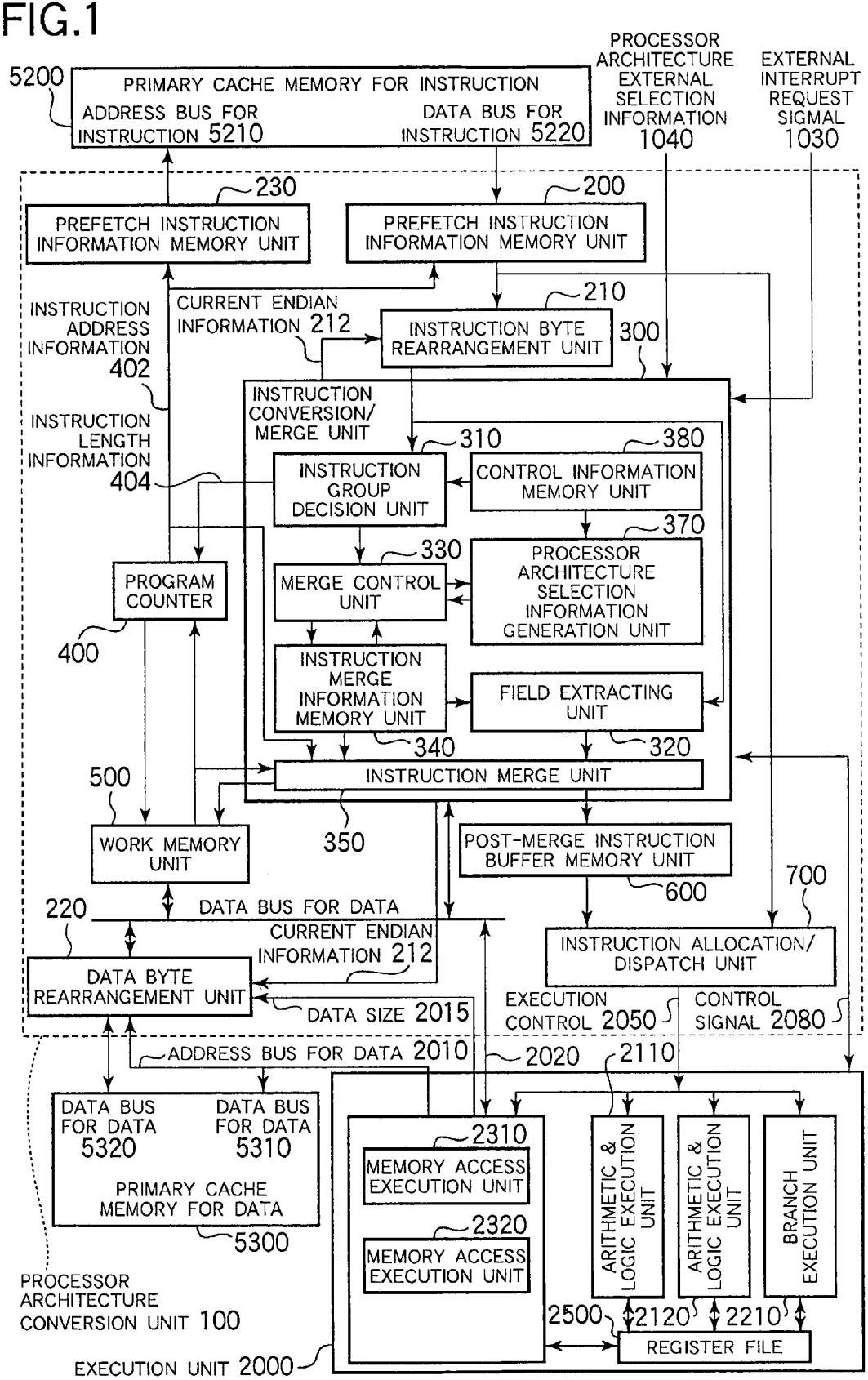
FIG. 1 is an explanatory block diagram for explaining detailed constitution of a processor capable of switching/reconstituting architecture.

FIG. 1 is a detailed block diagram of a processor capable of switching/reconstituting architecture according to an embodiment of the present invention.

A processor capable of switching/reconstituting architecture 5000 according to the invention is designed to be connected between an execution unit 2000 and a primary cache memory 5200 in which an instruction is stored, so as to enable execution of application software program on the execution unit 2000, which is described in a non-native instruction set (a processor assumed by the non-native instruction set as its own architecture is referred to as a "virtual processor") that is different from a native instruction set originally contained in the execution unit 2000, by properly converting a binary-code of an instruction word as the need arises when the execution unit 2000 fetches an instruction from the primary cache memory for instruction 5200 through a data bus 5220.

Also, the execution unit 2000 may be of a type that is provided therein with an instruction decoder for interpreting and executing the native instruction so that a native instruction can be executed by itself, or of a type without an instruction decoder for interpreting and executing an instruction, but to which a gate signal (execution control information) for controlling execution of various arithmetic and logic operation units in the execution unit is directly input. In the embodiment shown in FIG. 1, two arithmetic and logic execution units (2110, 2120) for executing various arithmetic and logic operations, and also a branch execution unit 2210, two memory access execution units 2310, 2320, etc. are provided around a general-purpose register file 2500. Since functions of these execution units are similar to those of a popular processor, description on the functions shall be omitted. Also, number of the arithmetic and logic execution units or memory access execution units, as well as bit width and number of the register file may vary depending on a performance required by a system, however difference in such detailed specifications is not concerned with the essence of the invention.

Referring to FIG. 1, a processor architecture conversion unit 100 includes a program counter 400, and an address information generated by a prefetch address generation unit 230 upon receiving instruction address information 402 generated in the program counter 400 is output to an address bus for instruction 5210, and a non-native instruction stored at the address on the primary cache memory for instruction 5200 is fetched through a data bus for instruction 5220 and is stored in a prefetch instruction buffer memory unit 200. This series of instruction fetch action is basically executed when a volume of instructions accumulated in the prefetch instruction buffer memory unit 200 becomes lower than a prescribed threshold value, regardless of an action status of the execution unit 2000. Meanwhile, when the execution unit 2000 performs data access (including both reading and writing actions), information of address bus 2010 for data output by the execution unit 2000 is directly output to an address bus 5310 of a primary cache memory for data 5300 and utilized as address information of the data access bus action, and data related to the data access is read and written through a data bus for data 2020, data byte rearrangement unit 220 and a data bus for data 5320. Such a system by which both instruction fetch access and data reading/writing access can be executed independently and simultaneously is known as Harvard architecture. (It is to be understood that names with a numeral such as "address information 999" represent a physical signal input or output among functional units shown in the embodiment drawings, instead of conceptual "information" transmitted through media. This applies to all the subsequent paragraphs.)

When a non-native instruction of not less than 1 byte is read out from the prefetch instruction buffer memory unit 200 based on the instruction address information 402 output by the program counter 400 and transmitted to an instruction conversion/merge unit 300 through an instruction byte rearrangement unit 210, the instruction is simultaneously provided to an instruction group decision unit 310 and a field extraction unit 320, so that in the instruction group decision unit 310 grouping of non-native instructions is performed, and in the field extraction unit 320 a particular information field is extracted from the binary-code of the non-native instruction, respectively.

Figure 2:
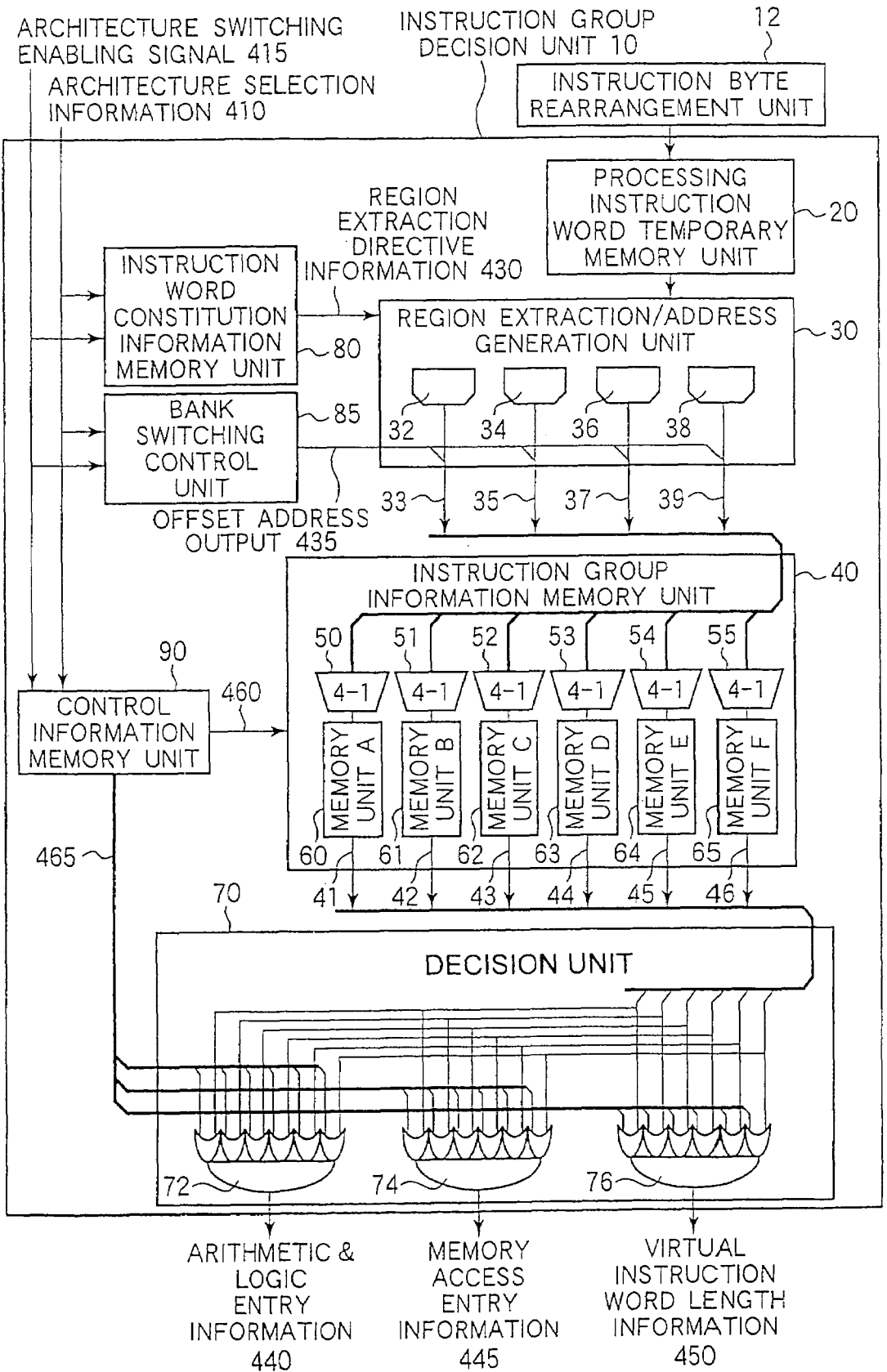
FIG. 2 is a block diagram showing an embodiment of an instruction group decision unit.

FIG. 2 is a block diagram of an instruction group decision unit 10 in which the instruction group deciding means according to the invention is employed. A processing instruction word temporary memory unit 20 is a memory region in which to store a binary-code of a non-native instruction word read out from the prefetch instruction buffer memory unit 12 to be processed next in the instruction group decision unit 10. Since a capacity of the processing instruction word temporary memory unit 20 is small, a register constituted of a flip flop may be employed instead of a memory. It is desirable to constitute a bus width from the prefetch instruction buffer memory unit 12 to the processing instruction word temporary memory unit 20 or a bit width of the processing instruction word temporary memory unit 20 itself in such a manner that a binary-code of an instruction word/extension word having at least a length of not less than a maximum possible word length of an instruction word can be read out and stored at a time. As a result, instruction group decision can be executed at a same throughput constantly, even when the non-native instruction set (virtual processor) architecture is switched.

Also, in case where the instruction group decision unit 10 is designed in such a manner that during an operation thereof the prefetch instruction buffer memory unit 12 is not updated, and that a binary-code of an instruction word/extension word of not less than one instruction word can be read out from the prefetch instruction buffer memory unit 12 at a time with the necessary and sufficient bus width, it is not imperatively necessary to provide the processing instruction word temporary memory unit 20, in which case an output of the prefetch instruction buffer memory unit 12 may be directly connected to the region extraction/address generation unit 30.

Further, in case where the processing instruction word temporary memory unit 20 is provided with a capacity of several instruction word lengths and a bus band capable of carrying an instruction word row corresponding to such capacity can be achieved between the processing instruction word temporary memory unit 20 and the prefetch instruction buffer memory unit 12, since an extension word portion in the stored instruction word row can be identified based on position information of the instruction word row stored in the processing instruction word temporary memory unit 20, it is possible to transfer a part of function of a bit field extraction unit 320 {refer to FIG. 1) into the instruction group decision unit 10.

The region extraction/address generation unit 30 divides a non-native instruction word read out from the processing instruction word temporary memory unit 20 or directly from the prefetch instruction buffer memory unit 12 into not less than one bit fields by region extraction directive information 430 stored in an instruction word constitution information memory unit 80, and adds an offset address output 435 stored in a bank switching control unit 85 to a value extracted in the respective bit fields, thus to generate an address by which to refer to a group candidate information table included in an instruction group information memory unit 80 installed in a posterior stage.

According to the embodiment of FIG. 2 the region extraction/address generation unit 30 comprises four region extraction units 32, 34, 36 and 38. The respective region extraction units may be packaged in such a manner that a bit field of an arbitrary bit width can be extracted from an arbitrary bit position of a binary-code of a non-native instruction word, while they may also be packaged with a restriction on the bit field position and width that can be extracted from each of the region extraction units in order to save circuit resources. However, it is to be considered that if degree of freedom of extractable bit fields is not sufficient, it becomes difficult to divide a binary-code of a non-native instruction word into two bit fields utilizing for instance two region extraction units 32 and 34, out of the four. But since it is easy to constitute a circuit for extracting a field of a particular position and particular bit width of a given binary value whatever the case may be, detailed description shall be omitted. Also, number of the region extraction units does not necessarily have to be four. Though the region extraction unit can be packaged generally in a combinational logic circuit, it is also possible to package in a circuit element such as FPGA that can reconstitute a logic, so as to reconstitute the entire region extraction unit according to a number of divided regions or range of bit field to be extracted appropriate to a combination of non-native instruction set types to be executed.

In the instruction word constitution information memory unit 80 information of divided position of bit fields of a binary-code of an instruction word is stored for each non-native processor architecture, and such information is referred to by classification information of the non-native processor architecture (architecture selection information 410) being executed, and then region extraction directive information 430 is output at an appropriate timing designated by an architecture switching enabling signal 415. The architecture selection information 410 and architecture switching enabling signal 415 are signals provided by an appropriate control circuit inside the processor architecture conversion unit 100 shown in FIG. 1, however in case where a timing of status transition of the architecture selection information 410 is properly controlled, the architecture switching enabling signal 415 may be omitted.

Offset address information of each non-native processor architecture for switching a reference page of the group candidate information table contained in the instruction group information memory unit 40 is stored in a bank switching control unit 85, and the offset address information is referred to by the architecture selection information 410 and then updated as offset address output 435 at an appropriate timing utilizing the architecture switching enabling signal 415. The offset address information is added to an output of the respective region extraction units 32, 34, 36 and 38 (extraction bit field output), while actually it is sufficient to connect a value of the offset address out put 435 to the region extraction output information. How to connect in such a case is not concerned with the spirit of the invention. Also, apart from a simple bit connection, values of the extraction bit field output and the offset address output may be merged through a specific arithmetic operation such as summation.

Information generated as a result of the merge 33, 35, 37 and 39 will subsequently become address information for referring to memory units 60 through 65 connected thereto (through multiplexers 50 through 55), in which case the address information 33, 35, 37 and 39 must always be provided with a certain bit width since it is realistic to design and manufacture the memory units 60 through 65 etc. with a prescribed memory capacity regardless of a constitution of the group candidate information table to be stored. Therefore, the generating means of the address information 33, 35, 37 and 39 must be capacitated to generate the address information 33, 35, 37 and 39 having a certain bit width, regardless of information merging method (simple bit connection or summation, etc.).

Since the address information is generated by merging with a value of the offset address output 435, reference pages of the memory units 60 through 65 in the instruction group information memory unit 40 can be switched at once by updating the value of the offset address output 435. Storing in advance the group candidate information table for grouping of instructions of different virtual processor in different reference pages of the memory units 60 through 65 enables instantaneous switching of the group candidate information table by updating the value of the offset address output 435, as well as switching of a virtual processor architecture to be sorted into instruction groups.

The instruction word constitution information memory unit 80 and the bank switching control unit 85 can be made capable of rewriting information to be stored if constituted by a memory or a register file respectively, while the bank switching control unit 85 may be constituted of a simple combinational logic circuit for generating necessary offset address output 435, in case where it is necessary to dynamically switch non-native processor architecture (virtual processor architecture) to be executed but number of types of the architecture is minimal, because the offset address output 435 only requires information of a small bit width. In addition, the instruction word constitution information memory unit 80 and the bank switching control unit 85 may be constituted of a circuit element such as FPGA that can reconstitute a logic, as the case may be.

The address information 33, 35, 37 and 39 generated by the region extraction/address generation unit 30 are utilized as address information by which to read out by reference from the memory unit 60 through 65 that store the group candidate information table in the instruction group information memory unit 40, and among the group candidate information 41 through 46 read out by reference, an instruction group of a given instruction word is decided through proper logic and arithmetic operation in an instruction group decision/arithmetic & logic unit 70. Generally, since there are a plurality of characteristics in instructions to be decided (hereinafter referred to as "property", including type of arithmetic and logic operation and addressing mode, etc.), the mentioned series of processing from the region extraction of the instruction word to group decision must be executed simultaneously in parallel through a plurality of systems, for the sake of improving processing performance of the system. Number of groups decided with respect to each instruction property is variable. Also, position, width and number of the bit fields required for group decision of an instruction property is not always constant in the group decision of all the instruction properties (A bit field that has been necessary for group decision of a first property may not be necessary for group decision of a second property.). Accordingly, a value that an address output from the respective region extraction units 32, 34, 36 and 38 can have as well as number of index words (number of reference address in the memory units 60 through 65 in which the table is stored) of corresponding group candidate information table may be different in each instruction property. All these parameters may naturally vary also by processor architecture. From such viewpoint, the system has to be constituted with a high degree of freedom that allows flexible setting of number of instruction properties to be decided in a group, type of bit field information (position and width of extracted bit) and number thereof required for the group decision, number of index words in the corresponding group candidate information table, and number of groups that each instruction property can make, etc.

According to the foregoing, in the embodiment shown in FIG. 2, the instruction group information memory unit 40 comprises multiplexers 50 through 55 for selecting one of the four address outputs 33, 35, 37 and 39 from the region extraction/address generation unit 30 according to information 460 from a control information memory unit 90, and six memory units 60 through 65 connected with the multiplexers, in which not less than one (specifically a same number as that of virtual processors) group candidate information tables, to be referred to by address output selected by the multiplexers, are stored in advance. An appropriate bit field to be used when referring to the group candidate information table (i.e. address output 33, 35, 37 and 39) is selected by the multiplexers 50 through 55 from each of the memory units 60 through 65 in which the group candidate information tables are stored. Then reference is made by the selected bit field as a reference address, to the respective group candidate information tables. The group candidate information table is a table wherein group candidate information showing in which group of the corresponding instruction property a value of bit field (i.e. one of the address output 33, 35, 37 or 39) selected by the multiplexers can be included is specified for each instruction property and each virtual processor architecture.

Figure 3A:
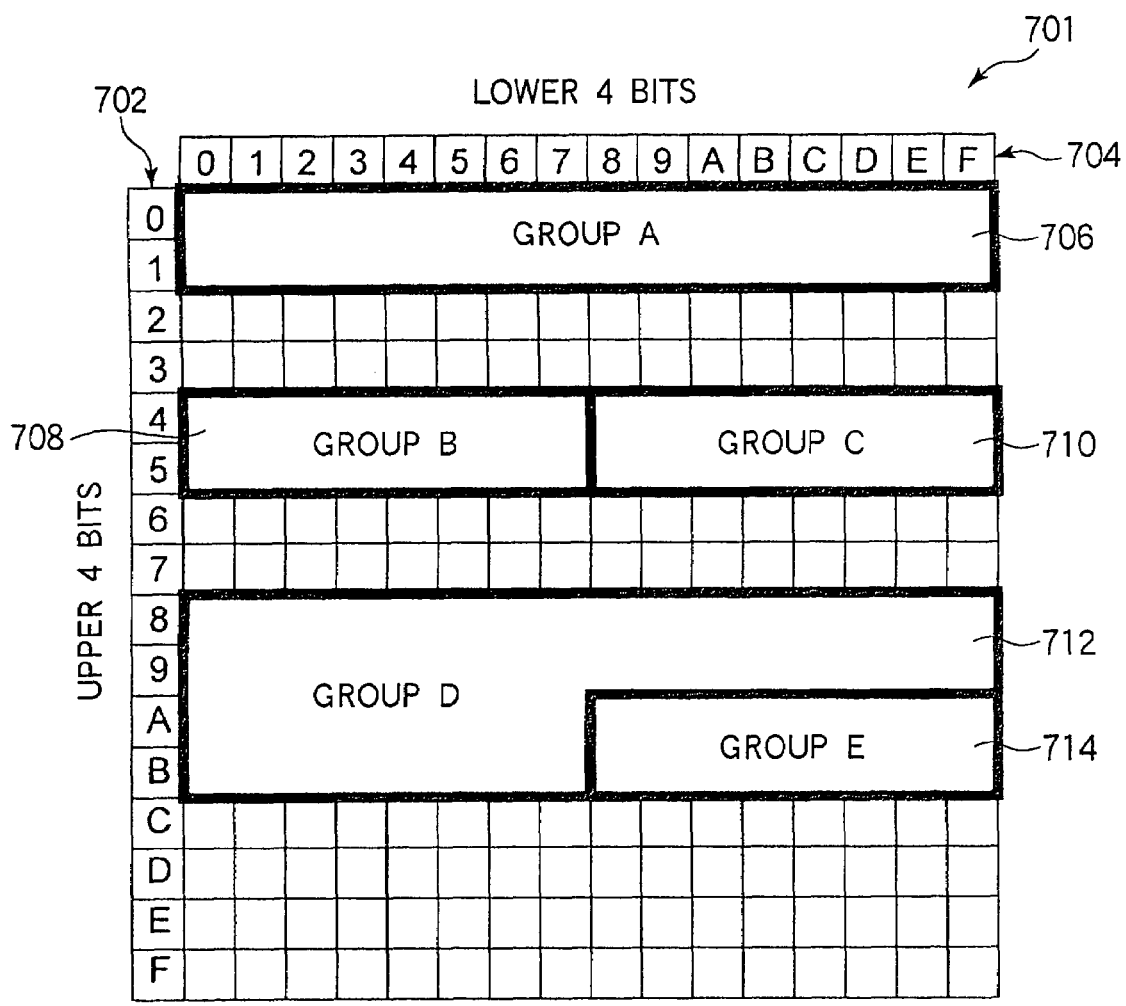
FIG. 3A is a distribution table of instruction groups in case where a binary-code of an instruction word is divided into two bit-fields.

Now referring to FIGS. 3A through 4B, problems related to execution of the foregoing instruction group deciding method shall be described with specific examples, and method for defining an instruction group by which an instruction group can be decided shall be proposed as a solution of such problems. Firstly, a relation between method of field dividing and of instruction grouping of a binary-code of an instruction word and possibility of deciding the instruction group shall be discussed. As an example, grouping method of an instruction set having a basic bit width of 8 bits shall be studied. FIG. 3A shows a grouping example of binary-codes of instruction word of such instruction set when divided into two regions of the upper 4 bits 702 and the lower 4 bits 704 in a two-dimensional instruction group distribution diagram 701. FIG. 3B includes examples of group candidate information tables in which the respective bit fields of the upper 4 bits 702 and the lower 4 bits 704 are used as index word based on the grouping performed as FIG. 3A, and in each table the group candidate information words are aligned in one dimension. Each of the group candidate information words in the group candidate information table shows an instruction group of not less than 0 corresponding to a given bit field value, and an instruction group of either 0 or 1 is finally selected upon integrating information obtained from the respective group candidate information tables (Specifically, AND is performed among the corresponding bits of all the group candidate information words, with the bits of the group candidate information 726 to 740, and 756 to 786 respectively.). For example, in case where 5B {in hexadecimal notation) is given as binary codes of instruction word, the AND for each bit calculated from the group candidate information 01100 {732 in FIG. 3B) that corresponds to 5 in the row of index words 722 of the group candidate information table 720 related to the upper 4 bits, and the group candidate information 10111 {778 in FIG. 3B) that corresponds to B in the row of index words 752 of the group candidate information table 750 related to the lower 4 bits becomes 00100. This result shows that the finally decided instruction group is the group C, according to the information 724 and 754 specifying a correspondence between the group candidate information word and the instruction group. Through a similar procedure, in case where an arbitrary binary-code of instruction word belonging to the group A or group B is given, an instruction group to which the binary-code of the instruction word belongs can also be correctly decided. On the other hand, with respect to the binary-code of the instruction word of A8 {in hexadecimal notation) belonging to the group E, information that it can belong to whichever of the group D or group E is obtained from the group candidate information table 720 related to the upper 4 bits as well as from the group candidate information table 750 related to the lower 4 bits, upon referring to the group candidate information tables, which makes it impossible to specify to which group the binary-code of the instruction word belongs, even by integrating the information.

Figure 4A:
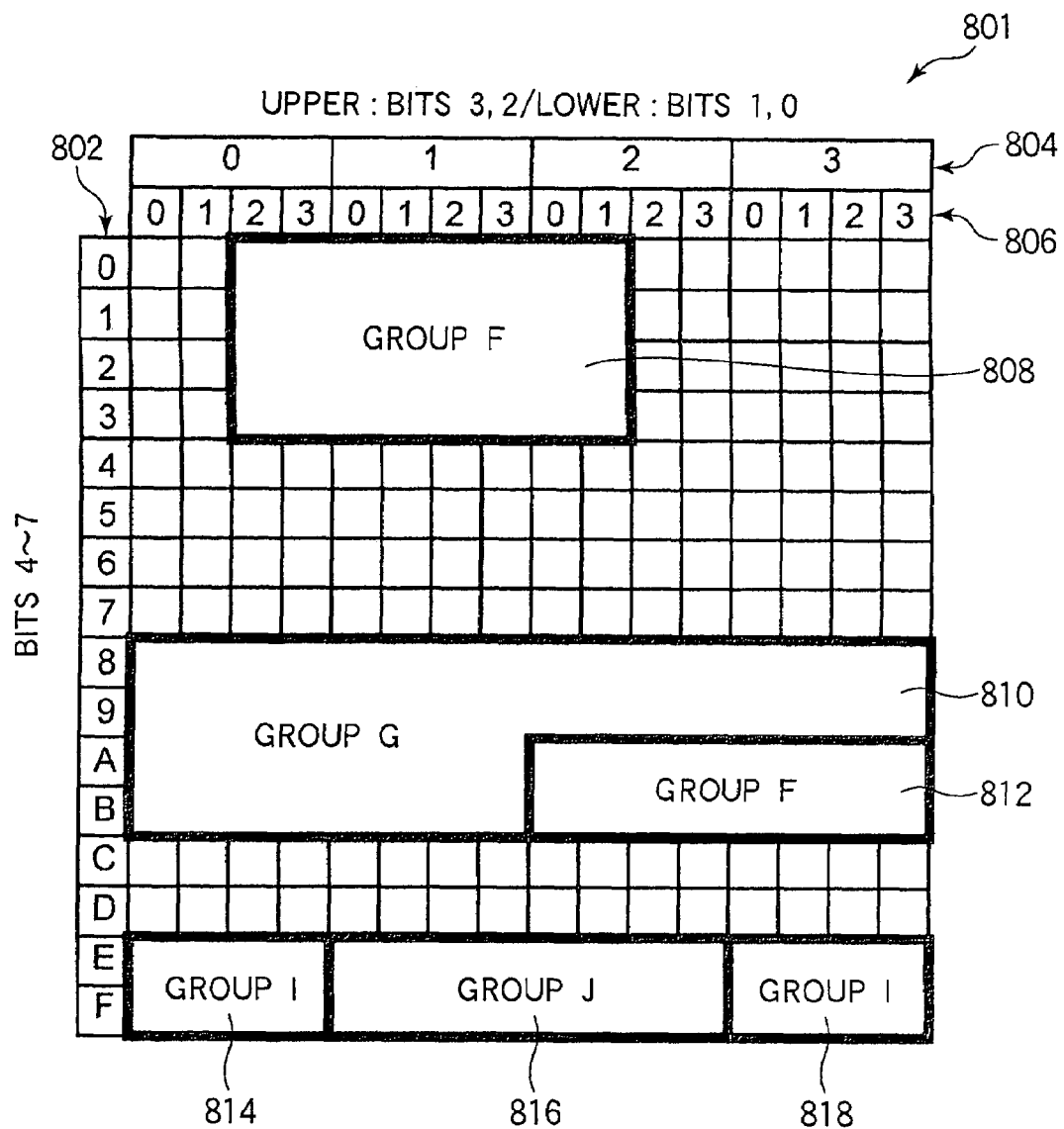
FIG. 4A is a distribution table of instruction groups in case where a binary-code of an instruction word is divided into three bit fields.
Figure 4B:
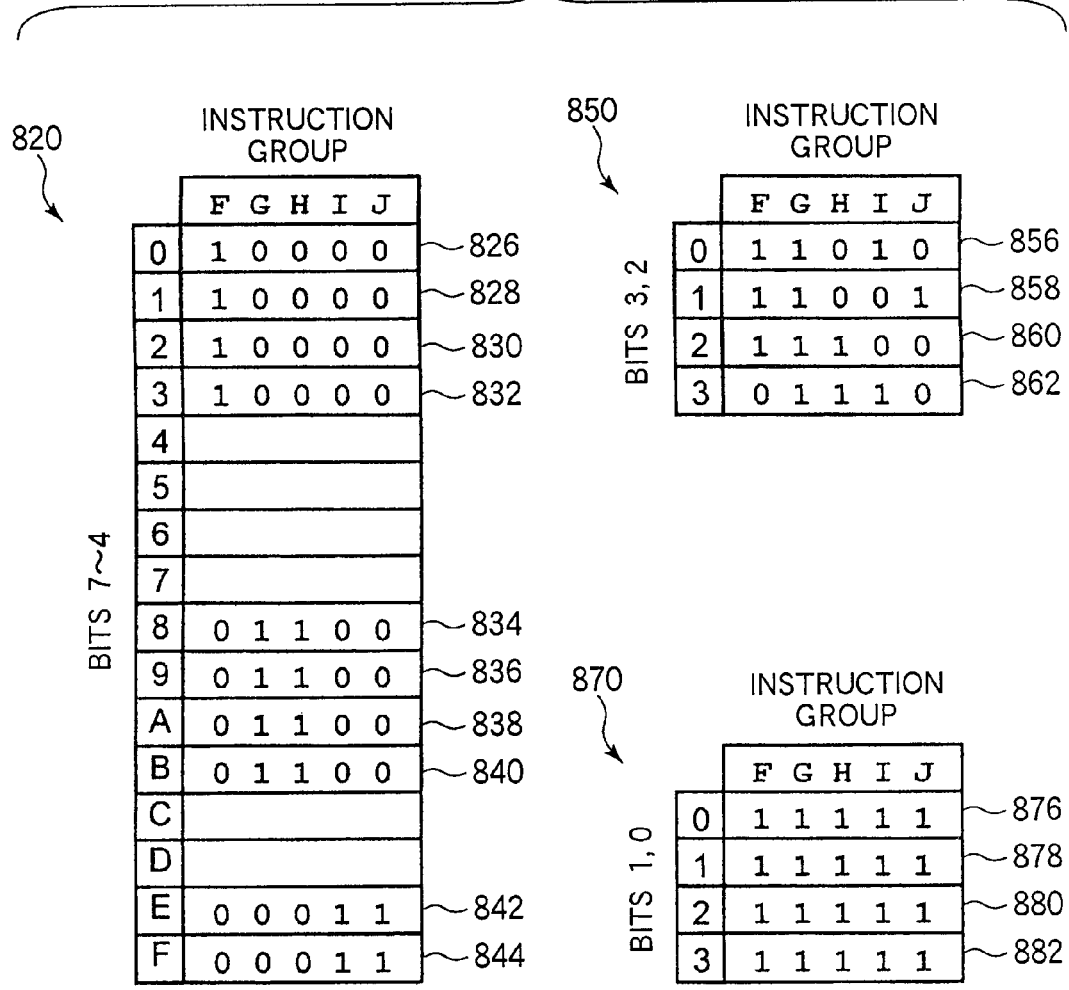

Likewise, grouping method shall be studied with a case where the binary-code of the instruction word of the above described instruction set is divided into three bit fields, namely a first bit field from bit 7 to bit 4, a second bit field from bit 3 to bit 2, and a third bit field from bit 1 to bit 0. FIG. 4A shows a grouping example in the case of dividing into three bit fields as above, wherein a combination of the second bit field value 804 and the third bit field value 806 is disposed in one dimension and the entire part is shown in two-dimensional instruction group distribution diagram 801. FIG. 4B includes examples of the first, second and third group candidate information tables in which the values that the respective bit fields can have are used as index words based on the grouping performed as FIG. 4A. The respective tables are provided with group candidate information 826 to 844, 856 to 862 and 876 to 882. It can be easily understood that an arbitrary binary-code of instruction word belonging to the group F can be correctly specified. With reference to the group I (regions 814 and 818 of FIG. 4A) and group J (region 816 of FIG. 4A) for example, information that the binary-code of the instruction word belonging to these groups can belong to whichever of the group I or group J can always be obtained from both the first group candidate information table 820 related to the bit field 802 from bit 7 to bit 4 and the third group candidate information table 870 related to the bit field 806 from bit 1 to bit 0, while information that the same instruction word can only belong to one of the group I or group J (it depends on the given binary-code of instruction word) is obtained from the second group candidate information table 850 related to the bit field from bit 3 to bit 2, therefore by integrating all the information a single group can be specified. Meanwhile, regarding the group H (region 812 of FIG. 4A), only such information can be obtained that the binary-code of the instruction word belonging to this group can belong to whichever of the group G or group H from all of the group candidate information tables, therefore it is impossible to finally specify to which group it belongs.

In view of the foregoing studies on grouping by dividing into two bit fields (FIGS. 3A and 3B) and grouping by dividing into three regions (FIGS. 4A and 4B), definition of the instruction group has to be properly accomplished in order to correctly decide an instruction group by the instruction group deciding means according to the invention. Specifically, the instruction group must be defined in such a manner that, in case where group candidate information showing possibility of correspondence to a plurality of instruction groups is obtained from a given bit field value with respect to an arbitrary value that an arbitrary bit field of an instruction word divided according to a dividing method of a binary-code of a given instruction word, group candidate information containing as a part or all thereof instruction sets consisting of not less than two arbitrary instruction groups included in the instruction group set will not be included as group candidate information obtained through a reference by at least one other bit field, in an entire range of a value that the bit field can have.

Upon studying on grouping method that satisfies the above condition through the two-dimensional instruction group distribution diagrams as FIGS. 3A and 4A, it is understood that the grouping has to be performed in such a manner that all the given instruction word group can respectively be enclosed in a rectangle (which must be a right angle quadrilateral, not a quadrilateral with a portion thereof cut off nor a polygon) as the group A or B in FIG. 3A. Also, in case where the binary-codes of instruction word to be grouped can be disposed adjacent to each other horizontally or vertically so that they can be enclosed in a quadrilateral (again, it should not be one with a portion thereof cut off nor a polygon) by rearranging lines and rows corresponding to each bit field, the binary-code of the instruction word groups that are separated like an enclave on the instruction group distribution diagram as the group I (regions 814 and 818) in FIG. 4A can also be grouped as one of the groups that can be decided. FIG. 5 schematically shows the above described situation. Under the condition that an instruction word belonging to an instruction group has a value s (910) or value t (912) in the bit field 1 (904) and a value m (906) or value n (908) in the bit field 2, since the instruction group deciding means according to the invention regards all the instruction words that have a value s or value t in the bit field 1 and that have a value m or value n in the bit field 2 as components of the same instruction group, all the four instruction words op1 (914), op2 (916), op3 (918) and op4 (920) in FIG. 5 located within the short rectangular region formed by the respective intersections of the rows s and t and lines m and n are recognized as belonging to the same instruction group. Accordingly, for example if only three of these instruction words op1, op2 and op3 are grouped on FIG. 5 excluding op4, they cannot be correctly recognized since they cannot be disposed within a rectangle on the two-dimensional instruction group distribution diagram.

In other words, therefore, a solution is to determine in each divided bit field a numerical value group consisting of an arbitrary numerical value not less than one among those values that the divided bit field can have, and to define an instruction group in such a manner that an instruction determined by concatenating all the numerical values selected in ones from the numerical value groups of all the bit fields can form a group by all combinations of the values that are components of the numerical group of each bit field.

The foregoing grouping method utilizing an instruction group distribution diagram is similar to a method in which Carnot chart is used, widely known as a method for optimizing a logic circuit according to diagrams. Also, mechanical optimization of a logic circuit by computer program has become a popular practice today. Accordingly, it is possible to automatize the grouping of instructions and division of the binary-code of instruction word into bit fields by computer program so that the group candidate information table can be automatically established, through a method similar to the optimization of a logic circuit.

Figure 3B:
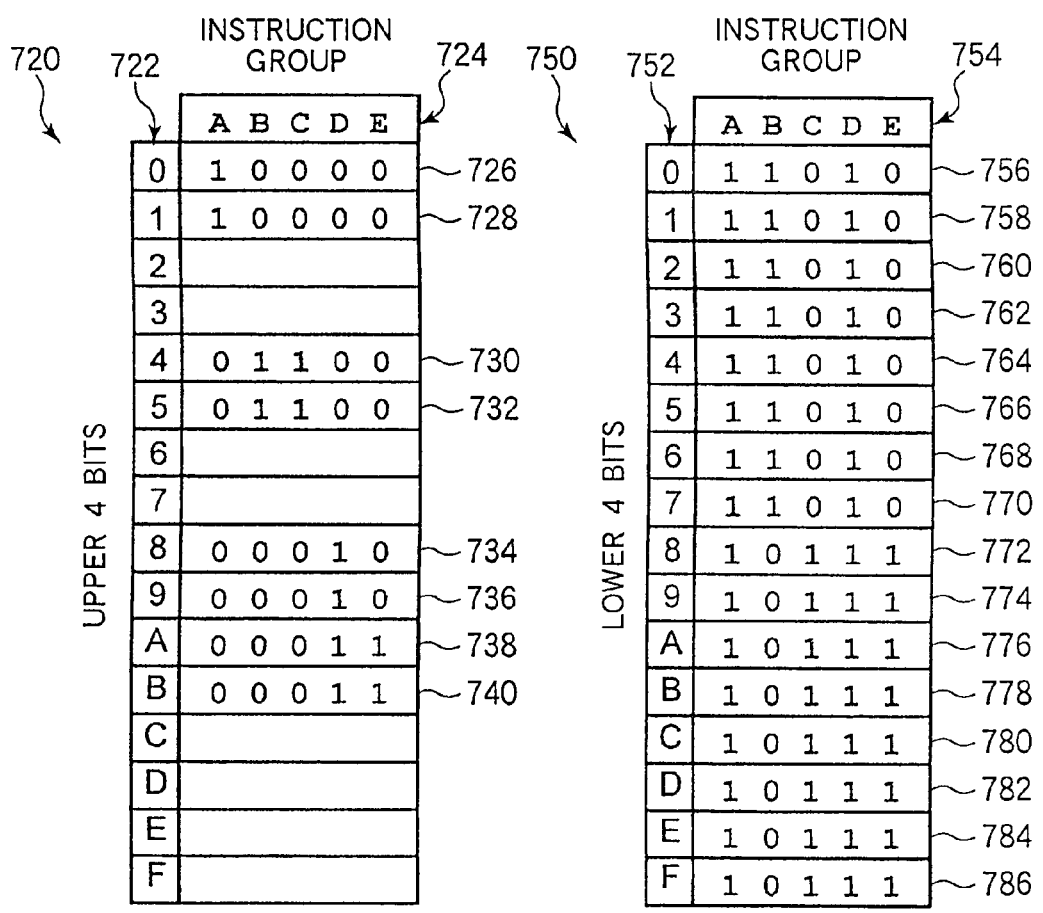
FIG. 3B includes group candidate information tables in case where a binary-code of an instruction word is divided into two bit fields.

The memory units 60 through 65 may be constituted of small capacity memories. Preferable constitution examples of the group candidate information table to be stored in these memory units are shown in FIGS. 3B and 4B. Each of the group candidate information table contains not less than one group candidate information, bit width of which is not less than a number of the instruction groups as shown in FIGS. 3B and 4B, and the data form is designed in such a manner that each bit corresponds one-on-one to an instruction group, so as to show whether a bit field value being referred to is included in its corresponding instruction group, for instance whether the bit 0 of the group candidate information is included in the instruction group 0, or whether the bit 10 is in the instruction group 10. Thus it is preferable to provide a data width of the small capacity memory that is not less than a maximum number of instruction groups that can be a group option. Specifically, since in most of the processors non-native instruction sets are classified into approximately 200 instruction groups through grouping process, it is appropriate that data of the small capacity memory has a bit width of 256 bits or so. If non-native instruction sets can be classified in more or less 100 instruction groups, the bit width of the small capacity memory data has only to be 128 bits or so.

The instruction group decision unit 70 is, according to the embodiment of FIG. 2, constituted to output instruction group decision information for three instruction properties simultaneously. For such purpose the instruction group decision unit 70 comprises an OR circuit for selecting the group candidate information 41 through 46, and a AND circuit for logic operation to establish a final group decision. Referring to FIG. 2, the group candidate information 41 through 46 is output to the logic circuits (OR circuit/AND circuit) 72, 74 and 76, while selection control information 465 from the control information memory unit 90 is output to the logic circuits 72, 74 and 76. The respective logic circuits 72, 724 and 76 output instruction group decision information, including arithmetic & logic entry information 440 as a first instruction property, memory access entry information 445 as a second instruction property and virtual instruction word length information 450 as a third instruction property, based on the group candidate information 41 through 46 and selection control information 465. Since type (extracted bit position, bit width) and number of bit fields to be considered for group decision are different depending on nature of an instruction property as mentioned earlier, it is preferable to provide means for selecting group candidate information 41 through 46 read out by reference of an appropriate bit field (one of the address output 33, 35, 37 or 39) to be referred to when making a group decision of an instruction property, and means for deciding a group, for executing logic operation with the selected group candidate information and making a final decision with respect to the instruction property.

A first reason of adopting the group decision is that a rule is established regarding definition of group candidate information data, that 1 should be stored for a bit position of group candidate information corresponding to not less than one instruction group that can include a bit field value given for reference of group candidate information, while 0 should be stored for other bit positions. A second reason is that, since the respective group candidate information referred to is showing that the corresponding bit field value can be included in a plurality of instruction groups (more specifically, a bit position corresponding to a plurality of instruction groups may have 1), in order to decide a single instruction group from not less than one group candidate information in such status, it is appropriate to execute AND operation of the bits mutually corresponding between the referred group candidate information. A third reason is that, as far as a bit field that can be disregarded in the AND operation is concerned, 1 can always be given to an input signal of the corresponding AND (in other words, 1 is given by OR by outputting "1" as selection control information for an input signal bit that can be disregarded). In addition, in case of logical inversion with respect to the definition of the group candidate information in the foregoing examples, the OR circuit can be employed for the logic operation for the final group decision, and 0 can always be given by AND to a bit field that can be disregarded in the OR operation.

The reason that the instruction group decision unit 10 executes instruction group decision of arithmetic & logic operation instruction {to be output to 440), instruction group decision of memory access instruction {to be output to 445) and virtual instruction word length decision {to be output to 450) in parallel, is because the instruction merge information memory unit 330 {refer to FIG. 1) of a subsequent process is provided with a function to refer to instruction merge information for arithmetic & logic operation instruction and to instruction merge information for memory access instruction independently and simultaneously, and is designed to update the virtual program counter 400 at the same time with virtual instruction word length information. Also, classifying an instruction group into a plurality of instructlon groups from the viewpoint of the two properties {type of arithmetic and logic operation instruction and type of memory access) can reduce a total number of instruction groups required for the instruction group decision of a given virtual processor. This contributes in reducing bit length of group candidate information of one index word of the group candidate information table.

Further, in case where the instruction merge information memory unit 330 is constituted to store the instruction merge information in a single table containing both arithmetic and logic operation instruction and memory access instruction, and to sequentially execute instruction merging job with respect to each property, the instruction group information memory unit 40 and the instruction group decision 70 do not have to execute decision making in parallel as the embodiment of FIG. 2. In other words, instruction merging job can be repeated a plurality of times on the same circuit, thus to execute conversion of one non-native instruction.

Also, the embodiment of FIG. 2 is constituted to secure a maximum possible degree of freedom in reconstituting correspondence between the address information 33, 35, 37 and 39 output from the region extraction/address generation unit 30 and the memory units 60 through 65 included in the instruction group information memory unit 40, or correspondence between the group candidate information 41 through 46 output from the instruction group information memory unit 40 and the logical operator for deciding instruction group decision information output from the instruction group decision/arithmetic & logic unit 70, with an object to achieve a high degree of freedom in instruction decision, however if types of virtual processors to be executed can be restricted, it is possible to eliminate such reconstituting means, and to perform a packaging with limited signal connections among the hardware included in the processing units 30, 40 and 70.

Now back to FIG. 1, memory elements or the like are generally employed in the lookup table (grouping information memory unit) or grouping field extraction information memory unit utilized in the instruction group decision unit 310, or instruction merge information memory unit or control information memory unit 380 to be described later, while it is also possible to employ a ROM (Read Only Memory, including various masked types) or binary conversion circuit including a combinational logic circuit etc. in case where non-native instruction set architecture to be selected is reconstituted at the time of manufacturing a finished product (this can also be regarded as "reconstitution" because the architecture is uniquely constituted for the finished product regardless of an originally designed constitution) and can be fixed as it is; an anti-fuse type ROM or the like if reconstitution is desired only once after manufacturing a finished product; an EPROM (electrically programmable ROM, including UV erasing type, electric erasing type, etc.) or FRAM (ferroelectric body RAM) or the like if repeated reconstitution is desired, though not frequently, after manufacturing a finished product; or a RAM (random access memory, including static and dynamic types) or flip flop resistance or the like if frequent repetition of reconstitution is desired on an operation site of a finished product. Meanwhile, since an essence of the invention is that information that is required for constitution of architecture is stored in the memorizing means, it is to be underlined that it does not matter whether reconstitution is static (low-frequency reconstitution such as just once after system resetting) or dynamic (frequent reconstitution during a system operation), or whether the reconstitution is to be executed in a manufacturing plant or on an operation site.

One of the properties that can be obtained through instruction group decision is an instruction word length (information showing how many bits the instruction has, which corresponds to instruction length information 404) of a non-native instruction. Such property can also be obtained through the third grouping field extraction unit, the third grouping information memory unit and the second group information selection unit. The instruction length information 404 thus obtained is transmitted to the program counter 400, to be utilized for computing a storage address of a next non-native instruction.

The foregoing passage has been described to the effect that the instruction group decision unit 310 performs grouping of instructions with respect to several properties, whereas with reference to grouped properties except the instruction length information 404, practically an arbitrary number is granted one-on-one to all the groups that a given property can have, so that by this number which group the property in question belongs to can be specified with respect to a given non-native instruction. The number to be granted to a property is utilized for identifying a property group, and serves as reference address information by which to refer instruction merge information (hereinafter to be referred to as "instruction merge entry information") to the instruction merge information memory unit 340 installed at a next stage.

The instruction merge entry information grouped at the instruction group decision unit 310 is then transmitted to the merge control unit 330 and the instruction merge information memory unit 340. FIG. 6 shows a detailed example of a constitution in the proximity of the instruction merge information memory unit 340. Arithmetic & logic entry information 312 and memory access entry information 314 are instruction merge entry information grouped and generated at the instruction group decision unit 310, the former of which mainly shows a storage address of instruction merge information stored in the instruction merge information memory unit 340 corresponding to each type of basic arithmetic and logic operation (the four operations, logical operation, etc.), while the latter shows a storage address of instruction merge information in the instruction merge information memory unit 340 related to memory access action to be taken when data to be processed by the arithmetic and logic operation (generally called as "operand") along with execution of an instruction is required to be transferred between a memory of instruction/data memory unit etc. and the processor. An object of the merge control unit 330 is to select appropriate instruction merge entry information based on architecture selection information 375 input thereto as well as on a status of various enabling signals, and to provide such instruction merge entry information 339 to the instruction merge information memory unit 340. Meanwhile, in case where a condition is established that the merge control unit 330 should select either the arithmetic & logic entry information 312 or memory access entry information 314, it depends on a status of the respective information which entry information (either 312 or 314) to practically select. For example, in case where memory access is required, the memory access entry information 312 retains a specific value showing that memory access is required, so as to be selected with priority to the arithmetic & logic entry information 314. And then the arithmetic & logic entry information 312 is referred to whenever necessary during a merging process of a memory access processing instruction indicated by the memory access entry information 314, so that corresponding arithmetic & logic operation instruction is merged and inserted. If an instruction does not require arithmetic & logic operation, the arithmetic & logic entry information 312 retains a specific value to such effect, so that an arithmetic & logic operation instruction is not merged. (In this passage "to merge an instruction" stands for putting various kinds of information together to generate a new native instruction. On the other hand, it is to be remarked that in some other passages mixing some instructions is referred to as "to merge an instruction".)

Generally a memory element or the like is used as the instruction merge information memory unit 340. A plurality of pieces of information selected and read out at the same time at the address decoder 140 upon performing memory reference with the instruction merge entry information 339 as address is utilized as master information for merging a native instruction or execution control information (hereinafter to be simply referred to as a "native instruction". Here, the native instruction is an instruction that can be directly executed by the execution unit when the execution unit is provided with its particular instruction decoder, while the execution control information is gate control information for directly controlling an arithmetic and logic operator included in the execution unit in case where the execution unit is not provided with its particular instruction decoder. Generally execution control information has a much longer word length than an encoded native instruction. Accordingly, encoding a part of the execution control information in order to shorten an information word length may also be an option.) to be executed by the execution unit 2000. Examples of instruction merge information read out from the instruction merge information memory unit 340 include the following: native instruction code 141, next address information 142, field extraction control information (1) 143A, field extraction control information (2) 143B, field extraction control information (3) 143C, next instruction fetch 146, switching enabling 147, interrupt enabling 148 and execution property 149.

The native instruction code 141 is basic information for merging a native instruction in the instruction merge unit 350, and such information serves as a template for merging an instruction so that arbitrary additional information is added as the need arises to a certain portion of the template, thus to merge a final native instruction. The additional information above referred to includes various kinds of information such as register address information, addressing mode designation information, immediate data numerical information, etc. that are parameters required for the operation of the instruction, included in a particular bit position on the native instruction word, absolute address information and relative address information and so on used in a branch instruction etc.

These kinds of information do not necessarily require binary conversion when merging a native instruction from a non-native instruction, and can be utilized upon inserting in a particular position of a native instruction word in a form of a bit row (generally called as a "field") extracted as it is in a particular bit width from a particular position of the non-native instruction word. Also, such information does not always occupy a certain bit position and bit width on a non-native instruction set, much less when the non-native instruction set to be processed is different the information occupies a quite different bit position and bit width in most of the cases, therefore it is appropriate to dispose field extractors 321 to 323 of a relatively small bit width not less than one for such case, to be properly selected and switched for serving the instruction merge unit 350. Information for controlling each field extractor (bit position or bit width on a non-native instruction word, and a control signal from information selection unit 357 and 358 etc., which are omitted in FIG. 6) included in a field extraction unit 320 is provided as a part of the field extraction information (143A to 143C in FIG. 6) read out from the instruction merge information memory unit 340.

Various methods are feasible for adding the additional information, among which the embodiment of FIG. 6 adopts such method wherein a native instruction code 41 has a same bit length as a basic length of a converted native instruction word, and information of a particular prescribed bit position on the native instruction word is substituted (selected by the information selection unit 357 and 358 etc.) when necessary by information extracted from the non-native instruction word by the field extraction unit 320. In addition, a field position on a native instruction word corresponding to the additional information may be fixed regardless of instruction depending on architecture of the execution unit, in which case the information selection units 357 and 358 may be omitted, and a length of the native instruction code 41 may be determined simply by subtracting a bit length of the additional information from a total bit length of the converted native instruction.

The native instruction information merged at the instruction merge unit 350 includes, apart from the above information embedded in a basic word of the native instruction, such information that is extracted from a non-native instruction word by the field extraction unit 320, or is processed at the instruction merge unit 350 and generated anew as an extension word of the native instruction word based on information from the program counter 400 or work memory unit 500. In case where the information is based on a part of the non-native instruction word or an extension word thereof, the information is provided to the information selection unit 351 through the field extractor 323 while the information from the program counter 400 or work memory unit 500 is provided directly to the information selection unit 351, following which such information is appropriately selected; the selected information is processed by various arithmetic and logic operators including the bit rearrangement circuit 352, byte rearrangement circuit 354, numerical extension circuit 355, summation circuit 356 etc.; selected at the information selection unit 359; added to the basic word of the native instruction as an extension word of the native instruction; and an instruction row that the execution unit 2000 can execute (execution control information) is generated. The extension word is not always generated, but that only when necessary the required information is processed by a required arithmetic and logic operation and added to the basic native instruction word. A signal that indicates when which information is how processed is an instruction merge information read out from the instruction merge information memory unit 340, shown as a part of the field extraction control information 3 (143C) in FIG. 6, by which the information selection units 351 and 359 are controlled; the respective arithmetic and logic operators 352, 354, 355 and 356 are controlled; and which is used as address information for reference to the work memory unit 500.

Among the four arithmetic and logic operators included in the instruction merge unit 350 in the embodiment of FIG. 6, objects and working examples of the three operators except the byte rearrangement unit 354 include the following.

The bit rearrangement unit 352 is used, for instance, for absorbing difference of frag disposition sequence in a condition codefrag register (different names are used depending on processor architecture, however herein a popularly used name is adopted, and hereinafter abbreviated as "CCR") that is different by processor architecture. For example, frags represented by C, V, N, Z (specific meaning of the respective frags is not an issue here therefore description thereof shall be omitted) are aligned in this sequence in a CCR of a virtual processor architecture, while in a CCR natively provided to hardware of the execution unit 2000 the frags are aligned as N, Z, V, C. On such assumption, it is predictable that a non-native instruction program before conversion and a converted native instruction may act differently through a simple instruction conversion, because of the difference of frag disposition in the respective CCR of the non-native instruction set architecture and native instruction set architecture, when executing the following processing in the non-native software program. (Grammar of the respective instruction set architecture is arbitrarily assumed. With an object to emphasize the difference between the architectures, register names in a source code and appearance order of operands are modified.)

Non-native instruction program before conversion: MOVE #8, D0; register DO is substituted by immediate data 8 AND DO, CCR; CCR is substituted by AND of DO and CCR, BCS Label; if C is set native instruction program after branch conversion to Label: LDI RO, 8; register RO is substituted by immediate data 8 AND CCR, CCR, R0; CCR is substituted by AND of RO and CCR JCS Label; if C is set, branch to Label.

This issue can be resolved by properly rearranging a bit alignment of a certain operand related to the instruction prior to execution of the instruction, in case where CCR is designated as an operand (in any case of destination/storage location/reference source) of an arbitrary instruction. According to the above example, the instruction requesting AND of RO and CCR within the native instruction program code after conversion is divided into the following two instructions and then converted.

Native instruction program after conversion: (only the AND portion of the above is extracted)

ST WORK, R0; R0 is stored in an arbitrary address WORK on the work memory unit 500

ANDI CCR, CCR, IMM; CCR is substituted by AND of the immediate data IMM and CCR.

Here, IMM stands is extension word read out from the address WORK in the work memory unit 500 when merging the ANDI instruction, with its bit alignment accordingly rearranged at the bit rearrangement unit 352, and added to the ANDI instruction through the information selection unit 359.

An object of the numerical extension unit 355 included in the instruction merge unit 350 is to convert immediate data or branch offset, etc. (most of which are an integer with a code) contained in a non-native instruction, when given with a short bit width (for instance 6 bits or 10 bits) below a data basic length (for instance 32 bits) into immediate data having a longer bit width (for instance 16 bits or 32 bits) than the original immediate data etc. that can be handled by the execution unit 2000. It is because width of immediate data that the execution unit 2000 can handle is not always the same as immediate data width handled by a virtual processor. Likewise, there are cases where short positive immediate data without a code needs to be extended to longer positive immediate data without a code. (Extension of negative immediate data without a code may theoretically take place, however actually nearly none is applied to popular processors.) Accordingly it is an object of the numerical extension unit 355 to extend immediate data with a short bit width to immediate data with a longer bit width, while since execution method of such extension is a quite simple technique regardless of whether the immediate data has a code or not, further description shall be omitted.

Now, a utilization example of the numerical extension unit 355 is given hereunder. Similarly to the foregoing example, grammar of the respective architecture of the virtual processor and execution unit is arbitrarily assumed.

Non-native instruction program before conversion:

MOVEQ #3, D0; Register DO is substituted by immediate data 3;

(width of the immediate data is 8 bits)

Native instruction program after conversion:

LDI R0, IMM; Register RO is substituted by immediate data IMM

Here, the immediate data IMM is an extension word to a native instruction word LDI extracted from a non-native instruction word by the field extractor 323, with its value extended to 32 bits by the numerical extension unit 355.

An object of the summation unit 356 included in the instruction merge unit 350 is to correct/absorb difference of program counter action resultant mainly from difference of the respective architecture design specifications of a virtual processor and execution unit. In general, a branch instruction or memory access instruction of a processor may be provided with such a kind of addressing mode (generally called as "program counter relative addressing mode") that makes access to an address that is a relative distance (generally called as "offset") apart with respect to a value of the program counter at the time of execution of the instruction. The offset value is given as a numerical value (with a code in general) in an instruction basic word or in an extension word, so as to be added to the program counter value at the time of execution of the instruction, wherein since instruction fetch action by the program counter is by nature taken prior to executing action of the fetched instruction, these actions are normally processed in a pipeline when packaging a popular processor, and consequently the program counter retains when executing the instruction a value leading by several addresses from (i.e. greater than) the fetched address of the instruction. When design specification of the processor architecture is different (i.e. the pipeline design is different), naturally the address leading distance varies. (However, even if the pipeline design is different, the address leading value can be maintained at a constant value through an intentional design.)

The embodiment shown in FIG. 1 is designed in such a manner that a branch instruction or memory access instruction relative to the program counter is executed as a relative access to the program counter 400. Since behavior of a program counter assumed by a virtual processor and that of a physical program counter of an existing processor (in this case the program counter 400) may be different, it may become necessary to correct the address leading value. It is an object of the summation unit 356. In addition, the summation unit 356 may also be utilized for execution of arithmetic and logic operation as a general-purpose arithmetic and logic operator, on behalf of the execution unit 2000. Also, functions of the summation unit 356 are not limited to summation only regardless of its name, but also imply subtraction function since immediate data with a code have to be handled. Accordingly, the summation unit 356 may also be named as summation subtraction unit. A utilization example of the numerical extension unit 355 shall now be given hereunder. Similarly to the foregoing example, grammar of the respective architecture of the virtual processor and execution unit is arbitrarily assumed.

Non-native instruction program before conversion:
BRA Offset; Branch to an address obtained by adding the Offset to a current value of the program counter
Native instruction program after conversion:
J Label; Branch to address of Label Here, the Label is an extension word to a native instruction word J, and immediate data (absolute address) obtained through summation of the Offset value extracted from the non-native instruction word by the field extractor 323, current value of the program counter 400 and a correction value (not shown in FIG. 6) at the summation unit 356.

In case where a processing branch is caused through execution of a branch instruction at the execution unit 2000, information to this effect is included, for example in the embodiment of FIG. 1, in control signal information 2080 and transmitted from the execution unit 2000 to the processor architecture conversion unit 100. Upon receipt of such information, the processor architecture conversion unit 100 branches (loads a non-continuous value) a value of the program counter 400 accordingly.

In the embodiment of FIG. 6, output information of the information selection unit 359 for outputting an extension word to a generated native instruction basic word is also provided to the work memory unit 500. As a result, when branching of a branch instruction takes place in the execution unit 2000, a branched address to be loaded for branching an address generated by the program counter 400 generating an instruction fetch address is computed in advance at the instruction merge unit 350 and accumulated in the work memory unit 500, so that the branched address corresponding to the branch instruction is read out from the work memory unit 500 when detecting a branch execution and loaded by the program counter 400, thus to accomplish correct branching. Method for fetching correct branched address information corresponding to the executed branch instruction from the work memory unit 500 includes, for example, generating suitable tag information corresponding to a branched address at the same time as computing/generating a branched address of the program counter 400; transmitting such tag information as one execution property of the instruction to the execution unit; meanwhile storing both the tag information and program counter branched address information in the work memory unit 500 in a form of a united pair; referring to the tag information in the work memory unit 500 by tag information output by the execution unit 2000 at the time of branch execution in response to the branch instruction; and fetching the corresponding program counter branched address information.

The native instruction thus merged at the instruction merge unit 350 is once retained in a post-merge instruction buffer memory unit 600 connected at a next stage (FIG. 6 shows load instruction 61A, arithmetic & logic instruction 62A and store instruction 63A, parameter fields related thereto 61C, 62B, 62C, 63B and 63C, extension words 61E and 63E, and execution property 61F, 62F and 63F, etc. as examples), and transmitted to an instruction allocation/dispatch unit 700 on FIFO (first in, first out) basis. The instruction allocation/dispatch unit 700 is constituted of a so-called dispatch unit, and is provided with a function to combine a plurality of instructions that do not mutually depend on among a plurality of native instructions merged in the instruction merge unit 350 so that they can be executed simultaneously, to properly combine and select a portion of a plurality of execution units provided in the execution unit 2000 according to the mentioned combination, and to emit the combining instruction as execution control information 2050 whenever necessary to the execution unit 2000. Since such functions of the instruction allocation/dispatch unit 700 are similar to those of popularly used dispatch units employed in processors based on super scalar technology, description in further details shall be omitted. In addition, in case where the execution unit 2000 is provided with an instruction decoder in it and can directly execute a native instruction from the decoder, the instruction parallel execution function can be utilized with respect to a native instruction too, by providing a native instruction read out from the prefetch instruction buffer memory unit 200 to the instruction allocation/dispatch unit 700.

The post-merge instruction buffer memory unit 600 is not an imperatively necessary unit for the purpose of processor architecture conversion, however since it offers the advantage that instruction conversion job can be proceeded in the processor architecture conversion unit 100 prior to fetching an instruction regardless of instruction fetch timing by the execution unit 2000, it is advantageous to install the post-merge instruction buffer memory unit 600. Further, post-merge instruction buffer memory filled signal 368 output from the post-merge instruction buffer memory unit 600 serves for requesting temporary suspension of instruction merging action to an anterior stage when a memory capacity of the post-merge instruction buffer memory unit 600 has become full (or reached a prescribed threshold value, for example 80% of the whole capacity), and such function can be accomplished by referring the signal, for instance, to the merge control unit 330.

In the embodiment of FIG. 6 the field extraction unit 320 is provided with three field extractors, while specification such as number or size (bit width) may vary depending on native instruction set architecture of the execution unit 2000 or non-native instruction set architecture to be converted, as already mentioned. Therefore, whatever such specification may be, it is within the scope of the embodiment of the invention. Also, FIG. 6 shows the bit rearrangement unit 352, byte rearrangement unit 354, numerical extension unit 355 and summation unit 356 as examples of arithmetic and logic operation functions provided to the instruction merge unit 350, while it is also possible to add other arithmetic and logic operation functions such as four operations, logic operation, bit shift, bit operation, etc., which case is also to be considered as within the scope of the embodiment of the invention.

According to the embodiment shown in FIG. 6, the instruction merge information memory unit 340 outputs information called execution property 149. This also includes information related to control of bus cycle boundary signal (included as one of bus control signals output by the processor capable of switching/reconstituting architecture, though omitted in the drawing of the embodiment) that shows where the bus cycle boundary is located, for instance in an instruction to perform memory access. The bus cycle boundary signal is not an indispensable function for the essence of the invention, however in case where a virtual processor is provided with an instruction to execute an atomic bus cycle (a bus cycle wherein a series of actions of read-modify & write, i.e. to read a designated address, to modify a value and to write it is inseparable in all cases) and also the system requires the bus cycle (typical case is that semaphore is employed in a multi master system), it becomes necessary to announce whether the bus cycle being executed is inseparable or not, which is the function of this signal. The bus cycle boundary signal is generated by properly delaying the bus boundary control information included in the execution property information 149 output by the instruction merge information memory unit 340 by an interval corresponding to a pipeline length to memory access instruction execution time. Since the instruction merge information memory unit 340 shows whether a native instruction requires an atomic bus cycle or not through the bus cycle boundary control information included in the execution property information 149 each time a native instruction is merged, it is possible to appropriately control the bus cycle boundary signal by a unit of the bus cycle included in the instruction. Furthermore, the execution property information 149 includes various execution property information related to the instruction, in addition to the bus boundary control information.

Other signals that the instruction merge information memory unit 340 outputs include next address information 342, next instruction fetch enabling signal 346, architecture switching enabling signal 347, internal interrupt enabling signal 348. These signals correspond to the output information of next address information 142, next instruction fetch 146, switching enabling 147, interrupt enabling 148 respectively, all of which are utilized as necessary information for controlling at the merge control unit 330. Further, in case where exclusive means for generating reference address for continuously referring to an address (entry) of the instruction merge information memory unit 340 is provided, the next address information may be omitted and substituted.

Entry information to be selected at the merge control unit 330 is determined through combination of status of the respective signals, for example, interrupt enabling task signal and architecture switching request signal, in addition to architecture switching enabling signal 347, internal interrupt enabling signal 348, external interrupt request signal 1030 and post-merge instruction buffer memory filled signal 368.

Firstly, when the post-merge instruction buffer memory filled signal 368 is "assert" (in an active sate), an instruction entry information selection unit (not shown) generates entry information instructing to "do nothing" as instruction merge entry information 339, so as to instruct the processor architecture conversion unit 100 system to suspend all instruction merging jobs until the post-merge instruction buffer memory unit 600 is relieved from a filled state. However, if necessary it is also possible to design in such a manner that even when the post-merge instruction buffer memory filled signal 368 is active, only provided that an internal or external request such as interruption, instruction conversion/merge job can be resumed in response to the interruption request, upon nullifying instructions on an appropriate instruction boundary of accumulated instructions on the post-merge instruction buffer memory unit 600.

When the post-merge instruction buffer memory filled signal 368 is not active, the instruction entry information unit outputs entry information corresponding to an appropriate processing to the instruction merge entry information 339, based on status evaluation of request/enabling signals related to architecture switching or to interruption processing. In case where none of the processing related to architecture switching or interruption processing is selected, the instruction entry information selection unit selects appropriate information among the next address information 342 output by the instruction merge information memory unit 340, arithmetic & logic entry information 312 or memory access entry information 314 output by the instruction group decision unit 310, and outputs to the instruction merge entry information 339. It mainly depends on a status of the next address information 342 which of the three kinds of information is selected. Specifically, the next address information 342 can have predetermined particular values for instructing to select either of the arithmetic & logic entry information 312 or memory access entry information 314, so that when the next address information 342 retains these values it selects a corresponding entry information, while if the next address information 342 is holding other values than the predetermined particular values the next address information 342 itself is selected.

A non-native instruction designated an address by the program counter 400 and fetched from the prefetch instruction buffer memory unit 200 is properly decided in a group at the instruction group decision unit 310, after which the instruction merge information memory unit 340 is read out by reference with a first entry address as start point designated by the arithmetic & logic entry information 312 or memory access entry information 314 output according to the group decision, and a first native instruction is merged based on the information that has been read out. In case where conversion of the non-native instruction to the first native instruction is insufficient (incomplete), the next address information 342 read out from the instruction merge information memory unit 340 at the same time as merging the first native instruction retains a second entry address information required for merging a second native instruction. This situation shows that merging the second native instruction is necessary. Accordingly, the instruction merge information memory unit 340 is again read out by reference with the second entry address information, and the second native instruction is merged. In this way, by checking the next address information 342 read out each time a native instruction is merged according to the foregoing step, it can be judged whether all necessary number of native instructions have been merged or a part thereof still has not been completed yet and additional merging of native instructions is required. While a plurality of native instructions corresponding to a non-native instruction are being merged, the next instruction fetch enabling signal 346 is "negate" (in an inactive state) and the program counter 400 retains a certain current value.

Upon completing merging of a necessary number of native instructions, the next address information 342 read out last from the instruction merge information memory unit 340 retains values that instruct to select either the arithmetic & logic entry information 312 or memory access entry information 314. The next instruction fetch enabling signal 346 also becomes "assert" at the same time, instructing to update a value of the program counter 400. Accordingly the value of the program counter 400 is updated, and with this new non-native instruction fetch address a new non-native instruction is fetched from the prefetch instruction buffer memory unit 200 and properly decided in group at the instruction group decision unit 310, and then the arithmetic & logic entry information 312 or memory access entry information 314 output in response to the group decision is selected as instruction merge entry information 339. Thereafter, the foregoing series of native instruction merging actions are repeated.

Selecting/switching processor architecture to be executed is immediately achieved by updating architecture selection information 410. However as described above, it is not desirable to switch the architecture selection information 410 while merging a plurality of native instructions from one non-native instruction. It is because coherency of the instruction set to be converted cannot be maintained through before and after the switching. Therefore, switching the virtual processor architecture, i.e. updating the architecture selection information 410 has to be performed at an appropriate boundary of the instruction merging job. This condition is secured by logic circuits included in processor architecture selection information generation unit 370 and merge control unit 330. These circuits also serve to perform formality processing related to context switching that may be required when selecting/switching the processor architecture. The processor architecture selection information generation unit 370 outputs interrupt enabling task signal, architecture switching request signal, architecture selection information, current endian information 212, and so forth.

Processor architecture switching has been described so far on the premise of a time division method wherein a timing is determined by properly segmenting a clock signal. However it is possible to execute the processor architecture switching by various other factors. An example is defining an exclusive instruction for urging processor architecture switching, so that processor architecture switching is activated upon executing such instruction. In case where formality processing such as retracting/resetting of a context along with the processor architecture switching is performed through execution of a native instruction as a part of the instruction merging job as described earlier, it is particularly easy to achieve the processor architecture switching by such exclusive instruction. Specifically it can be achieved by designating a certain instruction word not yet defined by a given instruction set as an architecture switching instruction, so that once such instruction binary-code is input formality processing of processor architecture switching is activated at the instruction conversion/merge unit 300.

Further, it is also possible to directly switch the processor architecture by input information called processor architecture external selection information 1040, transmitted from outside of the processor architecture conversion unit 100. It is not impossible to utilize such information as it is as the architecture selection information 410, however as already mentioned, such method is very dangerous for a system in which processor architecture is frequently switched. It is because, besides performing the switching asynchronously with the instruction merging job, the switching is not accompanied with storing/resetting a context. Accordingly, in an ordinary circumstance, it is desirable that, if the processor architecture external selection information 1040 is to be directly utilized at all for switching the processor architecture, the processor architecture external selection information 1040 is once input into the processor architecture selection information generation unit to be synchronized with the instruction merging job, so that switching can only be performed at an appropriate timing.

An object of the byte rearrangement units 210 and 220 shown in the unit of FIG. 1, and the byte rearrangement unit 354 shown in FIG. 6 is to correct difference of endian type, in case where the respective endian types of a virtual processor and the execution unit 2000 with respect to byte alignment sequence on an address space are different. However the byte rearrangement unit for data 220 has, in addition to the above, another object of selecting an appropriate byte data in accordance with data size and data disposition address from a memory data bus, and connecting such data with a prescribed bit position of the data bus 2020 of the execution unit. Therefore, in case where all the virtual processors have the same endian type as that of the execution unit 2000 (i.e. if switching the endian is not required), the byte rearrangement unit for instruction 210 and the byte rearrangement unit 354 can be omitted, while the byte rearrangement unit for data 220 cannot be omitted. (Nevertheless, regarding a portion of the byte rearrangement unit for data 220 that depends on endian types, only a part corresponding to one endian type can be omitted.)

Now, supplementary description shall be provided hereunder in addition to the foregoing embodiment, to disclose other embodiments of the invention that have not been particularly mentioned so far.

All context information (internal information) appropriate to each processor architecture (or each task) to be executed can be temporarily retracted to the work memory 500 etc. when switching processor architecture (or task), however for context information of a register directly connected with proper hardware such as especially the program counter 400 or a virtual frag register, a same number of physical registers as that of processor architecture (or task) to be executed may be provided, to be switched among them. The key point is to provide means for temporarily retracting context information appropriate to each processor architecture (or each task) both inside and outside the processor capable of switching/reconstituting architecture.

Expanding the idea of utilizing the work memory unit 500 as storage means of context information of each processor architecture (or each task) leads to utilizing a particular region secured on the work memory unit 500, instead of the general-purpose register (register file 2500) provided in the execution unit 2000, as a substance of a general-purpose register for a particular processor architecture. As a result, retracting/resetting job of the context information combined with processor architecture (or task) switching is alleviated, moreover in case where a number of general-purpose register provided in the execution unit 2000 is less than a number required by the processor architecture, the shortage can be compensated.

In the foregoing embodiment of FIG. 1 etc., so-called Harvard bus architecture of a separated type was the premise of the description of the bus through which the execution unit 2000 fetches an instruction and the bus through which the execution unit 2000 inputs and outputs operand data. This is because exclusive cache memories for instruction and data respectively are supposed as the primary cache memory. In case where the bus through which the execution unit 2000 fetches an instruction is a so-called unified bus architecture to be used in common for inputting and outputting operand data (i.e. when the processor architecture conversion unit 100 is directly connected with the instruction/data memory unit without providing a cache memory, or when a primary cache memory common to instruction and data is employed), the invention can still be embodied by individually installing a multiplexer for integrating the bus for instruction and bus for data in the data bus and address bus, and granting a function to select the bus for instruction for executing a routine but to select the bus for data only when an operand bus request is generated.

In the foregoing embodiment of FIG. 1 etc., a primary and a secondary cache memory are disposed between the processor architecture conversion unit 100, which is a core portion of the processor capable of switching/reconstituting architecture according to the invention, and the instruction/data memory unit (corresponding to a main memory etc. in an ordinary system) connected thereto, with an object to improve execution speed performance. On the other hand, it is also feasible to omit the cache memories, so as to connect the processor architecture conversion unit 100 directly with the instruction/data memory unit. Further, it is possible to constitute an embodiment wherein only the secondary cache memory common to instruction and data is omitted and the primary cache memory exclusive for instruction and data respectively is retained, or another embodiment wherein only the secondary cache memory common to instruction and data is retained, etc., all of which are to be considered within the scope of the embodiments to which the invention is applied.

Finally, pipeline method is already a common technique in today's processor designing, which is why description on pipeline is omitted in the foregoing description of various embodiments of the invention. For instance how many steps of pipelines to build, or where to dispose a register to divide each pipeline step, etc. is an issue related to economical or commercial factors such as maximum operational frequency or selling price of finished products and so on, and has nothing to do at all with the essence of the invention. Therefore, regardless of how the pipeline is constituted, it is within the scope of the invention.

What is claimed is:

1. A processor having changeable architecture, the processor having a processor core and having an execution unit and being connected with means, outside the processor core, for memorizing instructions, the processor comprising:
    means for generating instruction fetch addresses, for generating addresses of instructions to be fetched from said memorizing means;
    means for deciding, from among a plurality of groups, a group to which an instruction fetched from said memorizing means belongs, based on at least one property that represents a characteristic of said instruction;
    storing means, within the processor core, for storing processor architecture constitution information required for generating, from said fetched instructions, native instructions that said execution unit can execute directly, said storing means including an instruction merge information memory for storage of native instruction merge information derived from said means for deciding a group;
    means for extracting instruction parameter fields from said fetched instructions based on said native instruction merge information;
    means for merging the extracted instruction parameter fields and information based on said native instruction merge information, and thereby generating native instructions for execution by the execution unit;
    means for controlling said instruction fetch address generating means and discontinuously updating said instruction fetch addresses when instructions are branched in said execution unit; and
    means for designating a reference starting position to said processor architecture constitution information storing means;
    whereby a processor architecture can be selected from a plurality of processor architectures by updating said reference starting position, thus enabling execution of software designed for plural different processor architectures.

2. The processor having changeable architecture as set forth in claim 1, wherein said group deciding means divides processor instructions into at least two bit-fields, and determines numerical groups in the respective bit-fields that consist of not less than one arbitrary numeral among numerals that said divided bit-field can have, and then defines an instruction group in such a manner that an instruction established by concatenating all numerals selected in ones from the respective numerical groups in all said bit-fields constitutes one group by all the combinations of said numerals constituting said numerical groups of the respective bit-fields; said processor further comprising:
    at least one means for dividing processor instruction, for dividing said processor instruction in a similar way to dividing said bit-fields;
    means for memorizing division position information, for memorizing information that determines a division position of the respective bit-fields; and
    means for memorizing instruction group information of the respective bit-fields, wherein said instruction group information memorizing means is referred to based on said bit-field value extracted by dividing said processor instruction into not less than two bit-fields, and each bit of group candidate information read out by reference from said instruction group information memorizing means corresponds one-on-one to the respective instruction groups, and wherein said instruction group information corresponds to said instruction group in which said bitfield value being referred to is included.

3. The processor having changeable architecture as set forth in claim 2, further comprising means for finally deciding an instruction group included in common in all said group candidate information of said respective bit-fields, by which a finally determined instruction group decision information is output.

4. The processor having changeable architecture as set forth in claim 2, wherein an instruction property determined in said group deciding means includes instruction word length, and classification of whether the instruction is a basic instruction or an extended instruction, in addition to types of arithmetic and logic operation.

5. The processor having changeable architecture as set forth in claim 1, wherein said group deciding means determines, on the basis of each of bit rows of a processor instruction, numerical groups that consist of not less than one arbitrary numeral among numerals that said bit row can have, and then defines an instruction group in such a manner that an instruction established by concatenating all numerals selected in ones from the respective numerical groups of said bit rows of said processor instruction constitutes one group by all the combinations of said numerals constituting said numerical groups of said bit rows of said processor instruction.

6. The processor having changeable architecture as set forth in claim 5, further comprising means for finally deciding an instruction group included in common in all said group candidate information of said bit rows, by which a finally determined instruction group decision information is output.

7. The processor having changeable architecture as set forth in claim 5, wherein an instruction property determined in said group deciding means includes instruction word length, and classification of whether the instruction is a basic instruction or an extended instruction, in addition to types of arithmetic and logic operation.

8. The processor having changeable architecture as set forth in claim 1, further comprising:
    means for executing formality processing for an instruction to execute formality processing; and
    means for executing formality processing for executing exceptional processing appropriate to processor architecture.

9. The processor having changeable architecture as set forth in claim 1, further comprising means for correcting difference of hardware specification appropriate to processor architecture.

10. The processor having changeable architecture as set forth in claim 1, further comprising means for detaining execution by said execution unit while a native instruction are being generated by merging.

11. The processor having changeable architecture as set forth in claim 1, wherein said processor architecture constitution information memorizing means is a RAM.

12. The processor having changeable architecture as set forth in claim 1, wherein said processor architecture constitution information memorizing means is a non-volatile memory.

13. The processor having changeable architecture as set forth in claim 1, further comprising means, included as part of the merging means, for rearranging a byte.

14. The processor having changeable architecture as set forth in claim 1, further comprising means for rearranging instructions from which fields are to be extracted by the field extracting means.

15. The processor having changeable architecture as set forth in claim 1, further comprising a buffer memory, connected to said means for merging, for memorizing instructions.

16. The processor having changeable architecture as set forth in claim 1, further comprising means for temporarily memorizing branch address information that has been computed when merging branch instructions, wherein the branch address information is read out from the temporarily memorizing means when an instruction is branched in said execution unit and is substituted for the instruction fetch address generating means, whereby correct branching is carried out by the processor.

* * * * *

UNITED STATES PATENT AND TRADEMARK OFFICE
CERTIFICATE OF CORRECTION

PATENT NO.        : 7,162,617 B2                                           Page 1 of 1
APPLICATION NO. : 10/367097
DATED             : January 9, 2007
INVENTOR(S)       : Ken Ota and Toshiyuki Kochi It is certified that error appears in the above-identified patent and that said Letters Patent is hereby corrected as shown below:

On the cover sheet, under (73) Assignee: "Fine Arc Incorporated" should read --FineArch Inc.--.

Signed and Sealed this

Eighth Day of May, 2007

JON W. DUDAS
*Director of the United States Patent and Trademark Office*